United States Patent
Yang et al.

(10) Patent No.: US 9,917,930 B2
(45) Date of Patent: Mar. 13, 2018

(54) TRANSMITTING APPARATUS AND RECEIVING APPARATUS AND SIGNAL PROCESSING METHOD THEREOF

(71) Applicant: SAMSUNG ELECTRONICS CO., LTD., Suwon-si (KR)

(72) Inventors: Hyun-koo Yang, Seoul (KR); Sung-hee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 14/989,894

(22) Filed: Jan. 7, 2016

(65) Prior Publication Data

US 2016/0197826 A1    Jul. 7, 2016

Related U.S. Application Data

(60) Provisional application No. 62/159,436, filed on May 11, 2015, provisional application No. 62/100,556, filed on Jan. 7, 2015.

(30) Foreign Application Priority Data

Dec. 11, 2015    (KR) .................. 10-2015-0177018

(51) Int. Cl.
*H04L 29/06* (2006.01)
*H04L 29/08* (2006.01)

(52) U.S. Cl.
CPC .......... *H04L 69/22* (2013.01); *H04L 65/4076* (2013.01); *H04L 65/4084* (2013.01); (Continued)

(58) Field of Classification Search
CPC ....... H04L 45/74; H04L 69/22; H04L 65/607; H04L 5/0044; H04L 5/0053
See application file for complete search history.

(56) References Cited

U.S. PATENT DOCUMENTS

| | | |
|---|---|---|
| 2007/0033477 A1 | 2/2007 | Yoon |
| 2012/0307842 A1 | 12/2012 | Petrov et al. |
| 2014/0341103 A1* | 11/2014 | Hwang ............... H04W 72/005 370/312 |

FOREIGN PATENT DOCUMENTS

| | | |
|---|---|---|
| GB | 2515539 A | 12/2014 |
| KR | 10-2015-0001566 A | 1/2015 |
| WO | 2008/156257 A2 | 12/2008 |

OTHER PUBLICATIONS

David Gomez-Barquero et al., "DVB-NGH: The Next Generation of Digital Broadcast Services to Handheld Devices", IEEE Transactions on Broadcasting, vol. 60, Issue No. 2 Jun. 2014 pp. 246-257.

(Continued)

*Primary Examiner* — Jamal Javaid
(74) *Attorney, Agent, or Firm* — Sughrue Mion, PLLC

(57) ABSTRACT

Disclosed is a transmitting apparatus which includes: a packet generator generating a packet including a header and a payload from an input stream including a plurality of transport stream (TS) packets; and a signal processor signal-processing the packet, wherein the header includes a base header including a first field indicating a packet type which is the TS packets, and a second field indicating a number of TS packets included in the payload, wherein the base header further includes a third field set to a first value indicating that there is no additional header or a second value indicating that there is an additional header, wherein, when the third field is set to the second value, the additional header includes a fourth field indicating a number of deleted null packets with respect to each of at least one TS packet group including consecutive TS packets, and wherein the null packets deleted with respect to each of the TS packet group precede a first TS packet or follow a last TS packet included in each of the TS packet group.

9 Claims, 38 Drawing Sheets

(52) U.S. Cl.
CPC ............ *H04L 65/607* (2013.01); *H04L 67/32* (2013.01); *H04L 69/04* (2013.01)

(56) References Cited

OTHER PUBLICATIONS

International Search Report, issued by International Searching Authority in corresponding International Application No. PCT/KR2016/000137, dated Apr. 19, 2016. (PCT/ISA/210).
Written Opinion, issued by International Searching Authority in corresponding International Application No. PCT/KR2016/000137, dated Apr. 19, 2016. (PCT/ISA/237).

* cited by examiner

FIG. 18A

| Type (3b) | NPDI (1b) | NUMTS (4b) |
|---|---|---|

| EXT<br>(1b) | DNP<br>(7b) |
|---|---|
| 1840 | 1850 |

FIG. 18C

| 1850 | 1840 |
|---|---|
| DNP (7b) | EXT (1b) |

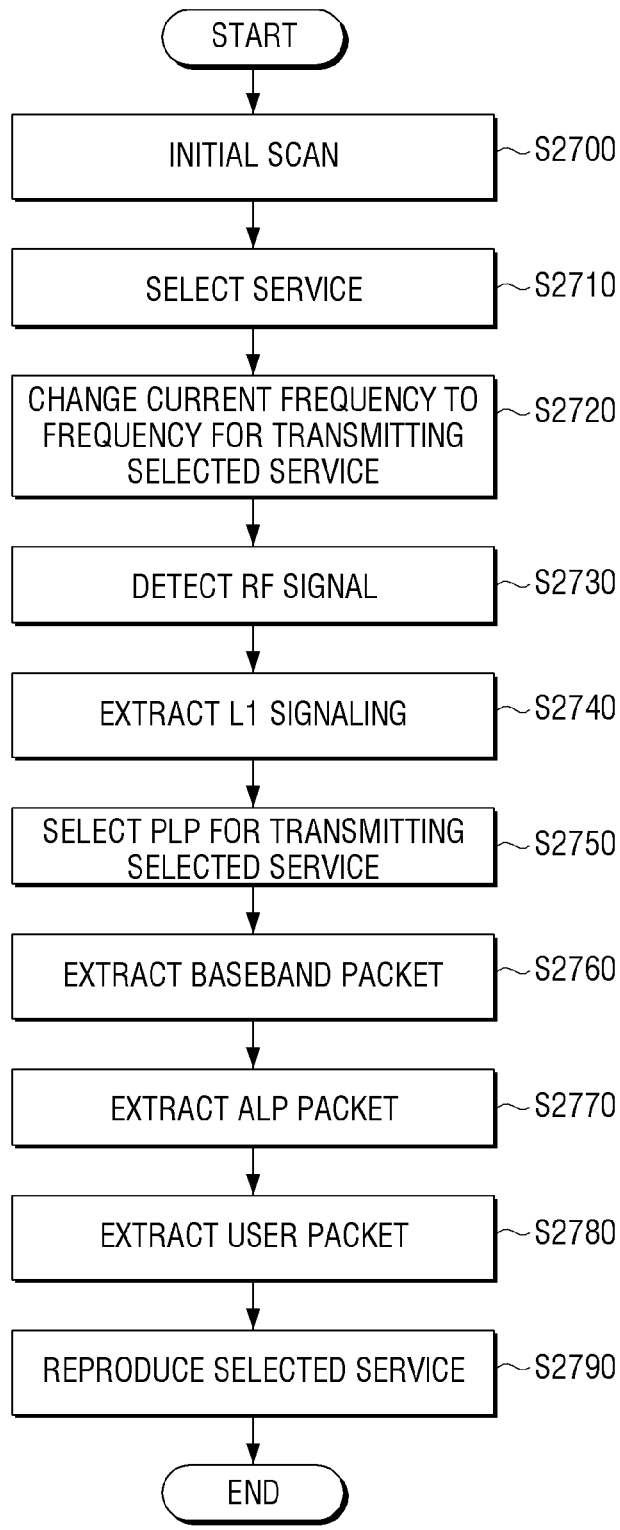

TRANSMITTING APPARATUS AND RECEIVING APPARATUS AND SIGNAL PROCESSING METHOD THEREOF

CROSS-REFERENCE TO THE RELATED APPLICATIONS

This application claims priority from Korean Patent Application No. 10-2015-0177018 filed on Dec. 11, 2015, in the Korean Intellectual Property Office, U.S. Provisional Application Ser. No. 62/159,436 filed on May 11, 2015 and U.S. Provisional Application Ser. No. 62/100,556 filed on Jan. 7, 2015, the disclosures of which are incorporated herein by reference in their entireties, respectively.

BACKGROUND

1. Field

Apparatuses and methods consistent with the exemplary embodiments relate to a transmitting apparatus and a receiving apparatus and a signal processing method thereof, and more particularly, to a transmitting apparatus which transmits data by mapping the data to at least one signal processing path and a receiving apparatus and a signal processing method thereof.

2. Description of the Related Art

In the information-oriented society of the $21^{st}$ century, broadcasting communication services are entering the era of digitization, multi-channel, broadband, and high quality. In particular, as high-quality digital television (TV), portable multimedia player (PMP), and portable broadcasting apparatuses have been increasingly used in recent years, there is an increasing demand for digital broadcasting services that are able to support various receiving methods. Further, there is also an increasing demand for data transmission of various pockets constituted by a moving picture experts group (MPEG)2-transport stream (TS) packet which is traditionally used through a broadcasting network and an Internet protocol based packet.

Thus, the broadcasting communication standard group has established various standards according to the demand to provide various services to satisfy user's needs. Still, however, a method for providing better broadcasting communication services with more excellent performance by using universal data is required.

SUMMARY

Exemplary embodiments of the inventive concept may overcome the above disadvantages and other disadvantages not described above. However, the exemplary embodiments are not required to overcome the disadvantages described above, and may not overcome any of the problems described above.

According to an aspect of an exemplary embodiment, there is provided a transmitting apparatus which may include: a packet generator generating a packet including a header and a payload from an input stream including a plurality of transport stream (TS) packets; and a signal processor signal-processing the packet, wherein the header includes a base header including a first field indicating a packet type which is the TS packets, and a second field indicating a number of TS packets included in the payload, wherein the base header further includes a third field set to a first value indicating that there is no additional header or a second value indicating that there is an additional header, wherein, when the third field is set to the second value, the additional header includes a fourth field indicating a number of deleted null packets with respect to each of at least one TS packet group including consecutive TS packets, and wherein the null packets deleted with respect to each of the TS packet group precede a first TS packet or follow a last TS packet included in each of the TS packet group.

According to an aspect of another exemplary embodiment, there is provided a signal processing method of a transmitting apparatus. The method may include: generating a packet comprising a header and a payload from an input stream comprising a plurality of transport stream (TS) packets; and signal-processing the generated packet, wherein the header includes a base header including a first field indicating a packet type which is the TS packets, and a second field indicating a number of TS packets included in the payload, wherein the base header further includes a third field set to a first value indicating that there is no additional header or a second value indicating that there is an additional header, wherein, when the third field is set to the second value, the additional header includes a fourth field indicating a number of deleted null packets with respect to each of at least one TS packet group including consecutive TS packets, and wherein the null packets deleted with respect to each of the TS packet group precede a first TS packet or follow a last TS packet included in each of the TS packet group.

According to various exemplary embodiments, since an input stream can be efficiently mapped to a physical layer, data processing efficiency can be improved.

Additional and/or other aspects and advantages of the inventive concept will be set forth in part in the description which follows and, in part, will be obvious from the description, or may be learned by practice of the presented embodiments.

BRIEF DESCRIPTION OF THE DRAWINGS

The above and/or other aspects of the inventive concept will be more apparent by describing certain exemplary embodiments with reference to the accompanying drawings, in which:

FIGS. 18A to 18C illustrate a header structure of an ALP packet according to other exemplary embodiments;

FIG. 27 is a flowchart schematically illustrating an operation of a receiver from the time when a user selects a service up to the time when the selected service is actually reproduced, according to an exemplary embodiment.

DETAILED DESCRIPTION OF THE EXEMPLARY EMBODIMENTS

Hereinafter, exemplary embodiments of the inventive concept will be described in detail with reference to the accompanying drawings.

An apparatus and a method proposed in the exemplary embodiments can be applied to various communication systems including mobile broadcasting services including a digital multimedia broadcasting (DMB), (hereinafter, referred to as 'DMB') service, digital video broadcasting handheld (DVP-H) (hereinafter, referred to as 'DVP-H'), an advanced television systems committee mobile/handheld (ATSC-M/H) (hereinafter, referred to as 'ATSC-M/H') service, an Internet protocol television (IPTV) service (hereinafter, referred to as 'IPTV') service, and the like, communication systems including a moving picture experts group (MPEG) media transport (MMT) (hereinafter, referred to as 'MMT') system, an evolved packet system (EPS) (hereinafter, referred to as 'EPS'), a long-terms evolution (LTE) (hereinafter, referred to as 'LTE') mobile communication system, a long-term evolution-advanced (LTE-A) (hereinafter, referred to as 'LTE-A') mobile communication system, a high speed downlink packet access (HDSPA) (hereinafter, referred to as 'HSDPA') mobile communication system, a high speed uplink packet access (HSUPA) (hereinafter, referred to as 'HSUPA') mobile communication system, a $3^{rd}$ generation project partnership 2 (3GPP2) (hereinafter, referred to as '3GPP2') high rate packet data (HRPD) (hereinafter, referred to as 'HRPD') mobile communication system, a 3GPP2 wideband code division multiple access (WCDMA) (hereinafter, referred to as 'WCDMA') mobile communication system, a 3GPP2 code division multiple access (CDMA) (hereinafter, referred to as 'CDMA') mobile communication system, an Institute of Electrical and Electronics Engineers (IEEE) (hereinafter, referred to as 'IEEE') 802.16m communication system, a mobile Internet protocol (Mobile IP) (hereinafter, referred to as 'Mobile IP') system, and the like.

Figure 1:
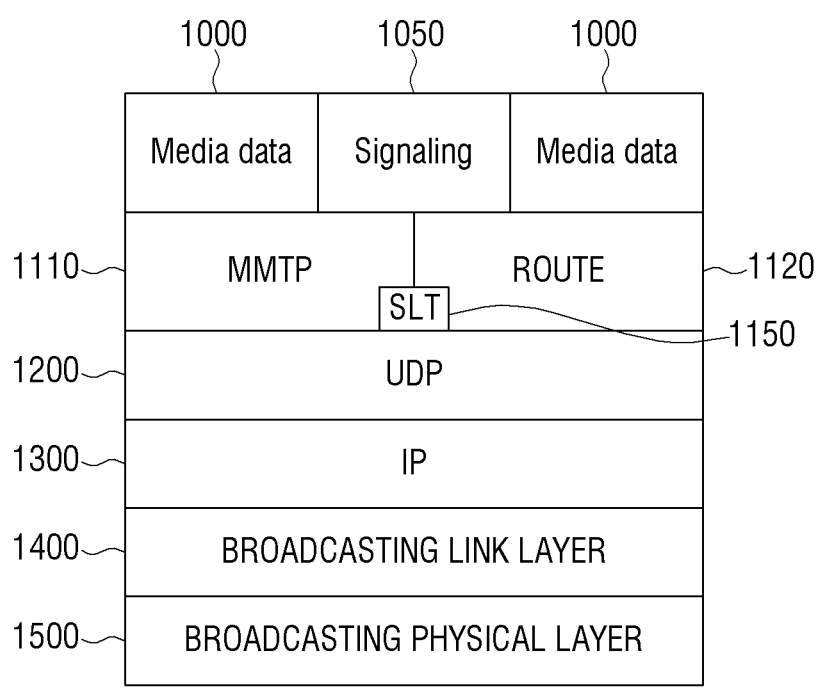
FIG. 1 is illustrates a hierarchical structure of a transmitting system according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required for a receiver to receive and consume the media data. The media data may be encapsulated in a format suitable for transmission prior to the transmission. An encapsulation method may follow a Media Processing Unit (MPU) defined in ISO/IEC 23008-1 MPEG MMT or a Dynamic Adaptive Streaming over HTTP (DASH) segment format defined in ISO/IEC 23009-1 DASH. The media data 1000 and the signaling 1050 are packetized based on an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application layer protocol in which the service is transmitted independently from the application layer protocol is required for the receiver to know which application layer protocol a specific service is transmitted by.

A service list table (SLT) 1150 illustrated in FIG. 1 constitutes information about the service by a table and packetizes the information in a signaling method for satisfying the aforementioned object. Detailed contents of the SLT will be described below. The packetized media data and the signaling including the SLT are transferred to the broadcasting link layer 1400 through a user datagram protocol (UDP) 1200 and an Internet protocol (IP) 1300. An example of the broadcasting link layer includes an ATSC 3.0 link-layer protocol (ALP) defined in ATSC 3.0. The ALP generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-TS packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio frequency (RF) signal, and transmits the RF signal. In this case, the broadcasting physical layer 1500 has at least one signal processing path. An example of the signal processing path may include a physical layer pipe (PLP) of DVB-T2 or ATSC 3.0, and entirety of one or more services or some of the services may be mapped to the PLP.

Figure 2:
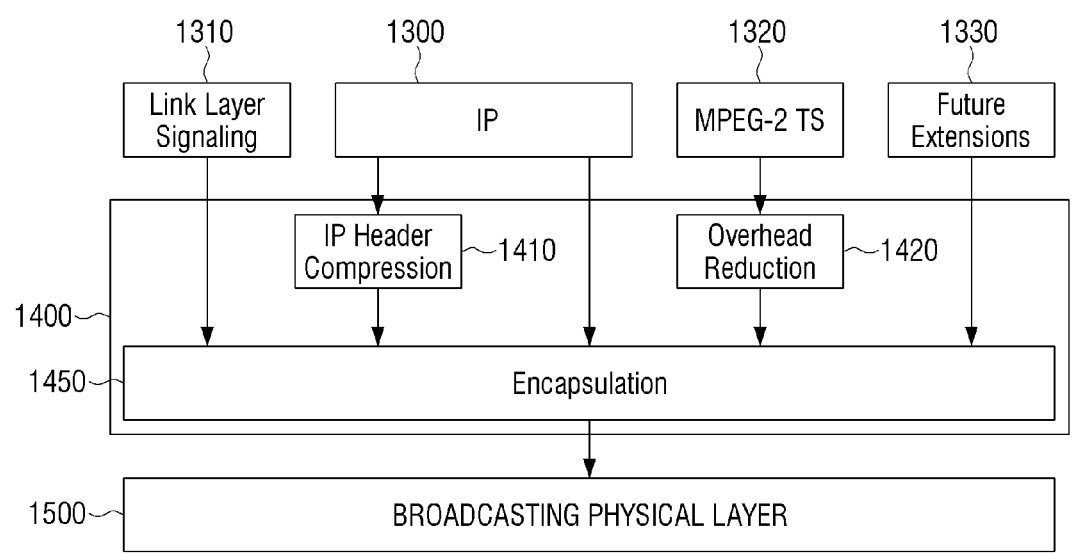
FIG. 2 illustrates a schematic configuration of a broadcasting link layer according to the exemplary embodiment.

FIG. 2 is a diagram illustrating a schematic configuration of a broadcasting link layer 1400 according to an exemplary embodiment.

Referring to FIG. 2, the input of the broadcasting link layer 1400 includes the IP packet 1300, and may further include a link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410, and the MPEG2-TS packet may be subjected to a header reducing (or overhead reduction) process 1420. During the ALP packetization, input packets may be subjected to dividing and merging processes.

Figure 3A:
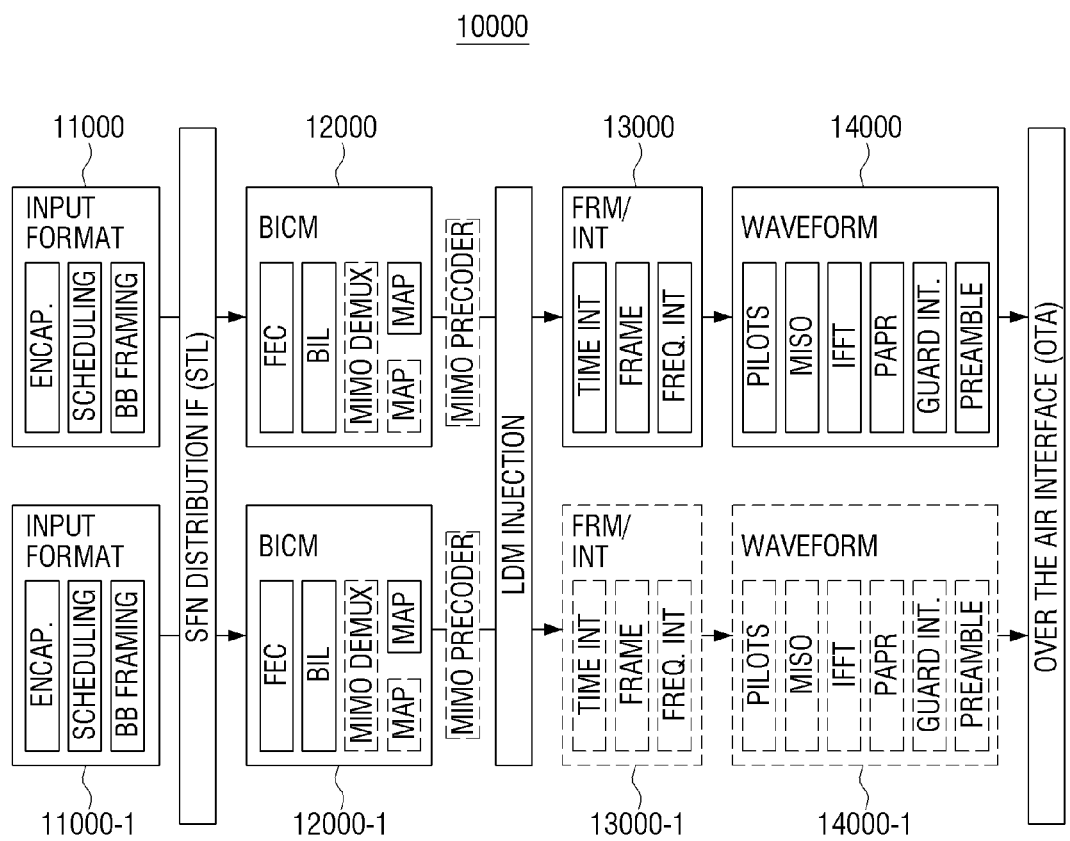
FIG. 3A illustrates a schematic configuration of a transmitting system (alternatively, a transmitting apparatus) according to an exemplary embodiment.

FIG. 3A is a diagram illustrating a schematic configuration of a transmitting system or apparatus according to an exemplary embodiment. According to FIG. 3A, a transmitting system 10000 according to the exemplary embodiment may include input formatting blocks (alternatively, parts) 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream which includes data to be serviced. Here, the input stream may be at least one of a transport stream (TS), an IP packet (e.g., IPv4 and IPv6), an MMT stream, a generic stream (GS), a generic stream encapsulation (GSE), and the like. For example, an ALP packet may be generated from the input stream, and the baseband packet may be generated from the ALP packet.

The BICM blocks 12000 and 12000-1 determine a forward error correction (FEC) coding rate and a constellation order according to an area (fixed PHY frame or mobile PHY frame) through which the data to be serviced will be transmitted, and perform encoding and time interleaving on the encoded data. Meanwhile, a signaling signal (also referred to as signaling information) for the data to be serviced may be encoded through a separate BICM encoder according to a system implementation or encoded by a same BICM encoder which decodes the data to be serviced.

The framing/interleaving blocks 13000 and 13000-1 combine the time-interleaved data with the signaling signal to generate a transmission frame.

The waveform generation blocks 14000 and 14000-1 generate an orthogonal frequency-division multiplexing (OFDM) signal in a time domain from the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Here, the blocks marked with the solid line are normal blocks, and the blocks marked with the dotted lines are blocks which may be used when an informative multiple-input and multiple-output (MIMO) system is implemented.

Figure 3B:
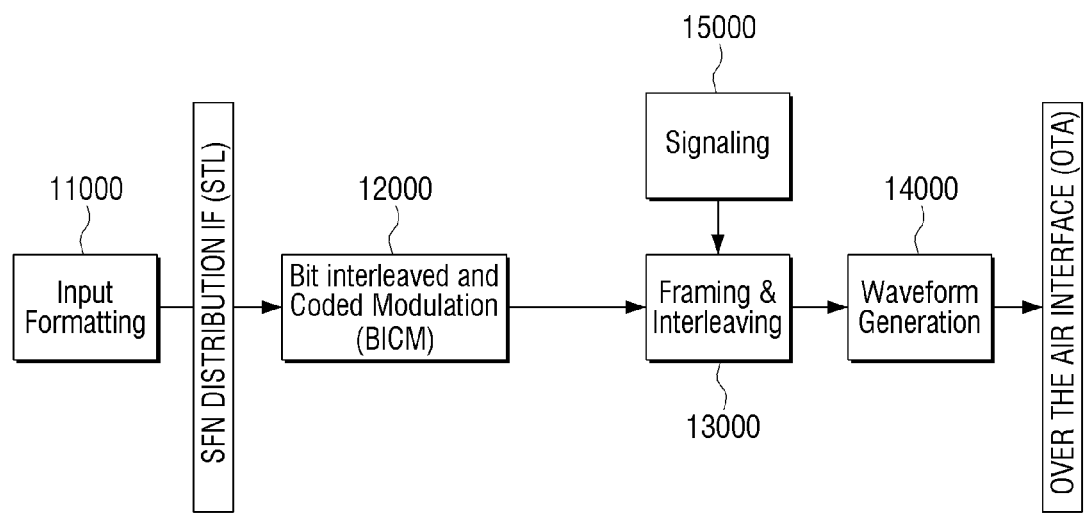
FIGS. 3B and 3C illustrate multiplexing methods according to exemplary embodiments.
Figure 3C:
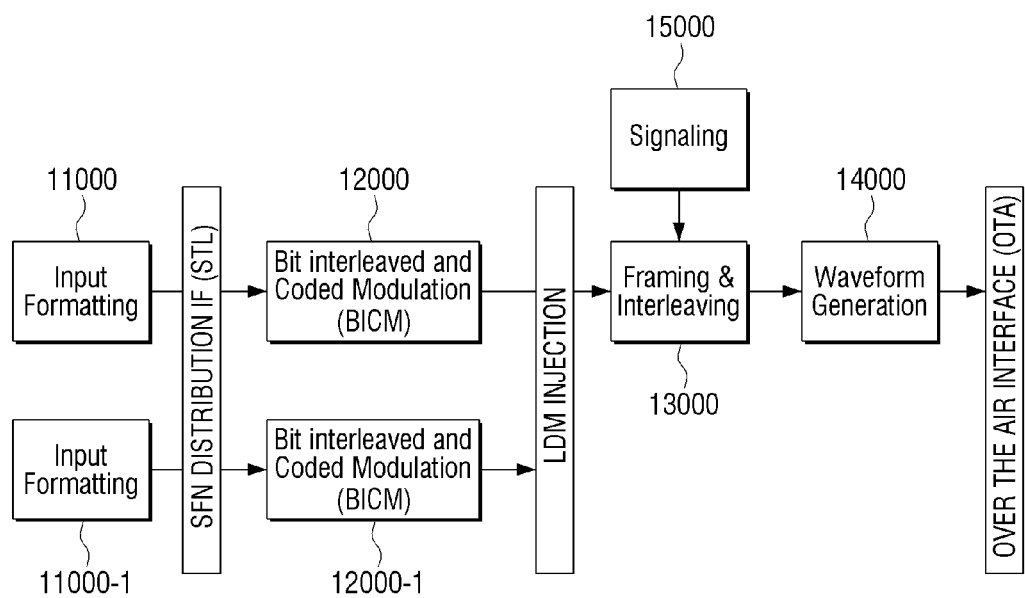

FIGS. 3B and 3C are diagrams illustrating a multiplexing method according to exemplary embodiments.

FIG. 3B illustrates a block diagram for implementing time division multiplexing (TDM) according to an exemplary embodiment.

In a TDM system architecture, four main blocks of the input formatting block 11000, the BICM block 12000, the framing/interleaving block 13000, and the waveform generation block 14000 are present.

Data is input to the input formatting block 11000 and formatted therein. Next, FEC is applied to the data and the data is mapped to a constellation in the BICM block 12000. Subsequently, the data is time and frequency-interleaved and the frame is generated in the framing/interleaving block 13000. Thereafter, an output waveform is generated in the waveform generation block 14000.

FIG. 3C illustrates a block diagram for implementing layered division multiplexing (LDM) according to an exemplary embodiment.

In an LDM system architecture, several other blocks are present as compared with the TDM system architecture. In detail, two separated input formatting blocks 11000 and 11000-1 and the BCIM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
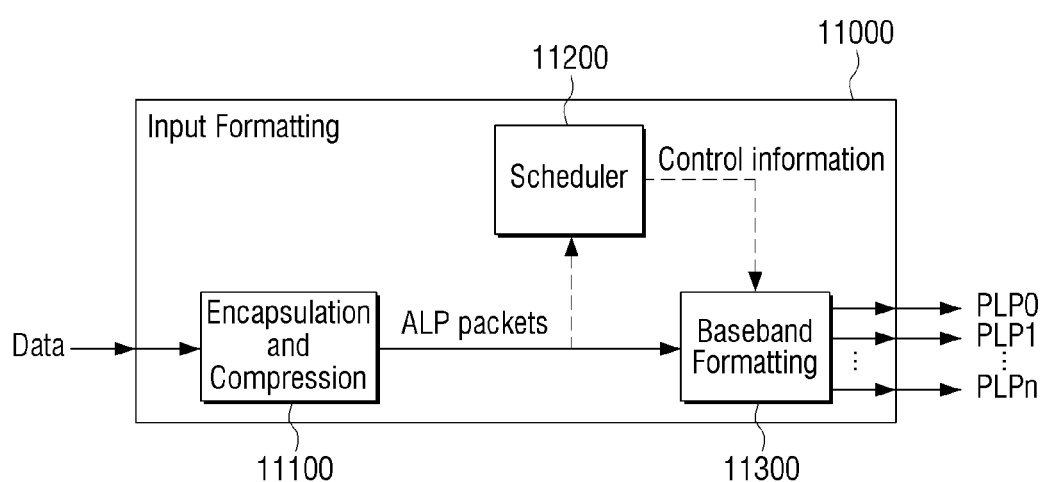
FIGS. 4 to 5B illustrate a detailed configuration of an input formatting block illustrated in FIG. 3A, according to exemplary embodiments.

FIG. 4 is a block diagram illustrating a detailed configuration of the input formatting block illustrated in FIG. 3A, according to an exemplary embodiment.

As illustrated in FIG. 4, the input formatting block 11000 includes three blocks that control packets to be formatted and distributed to PLPs. In detail, the input formatting block 11000 includes an encapsulation and compression block 11100, a baseband formatting block (alternatively, referred to as a baseband framing block) 11300, and a scheduler block 11200.

An input stream input into the encapsulation and compression block 11100 may be constituted by various types. For example, the input stream may be at least one of a TS, an IP packets (e.g., IPv4 and IPv6), an MMT stream, a GS, a GSE, and the like.

Packets output from the encapsulation and compression block 11100 become ALP packets which are generic packets, and alternatively referred to as a layer 2 (L2) packets. Herein, a format of the ALP packet may be one of a Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet may be 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to a system design.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
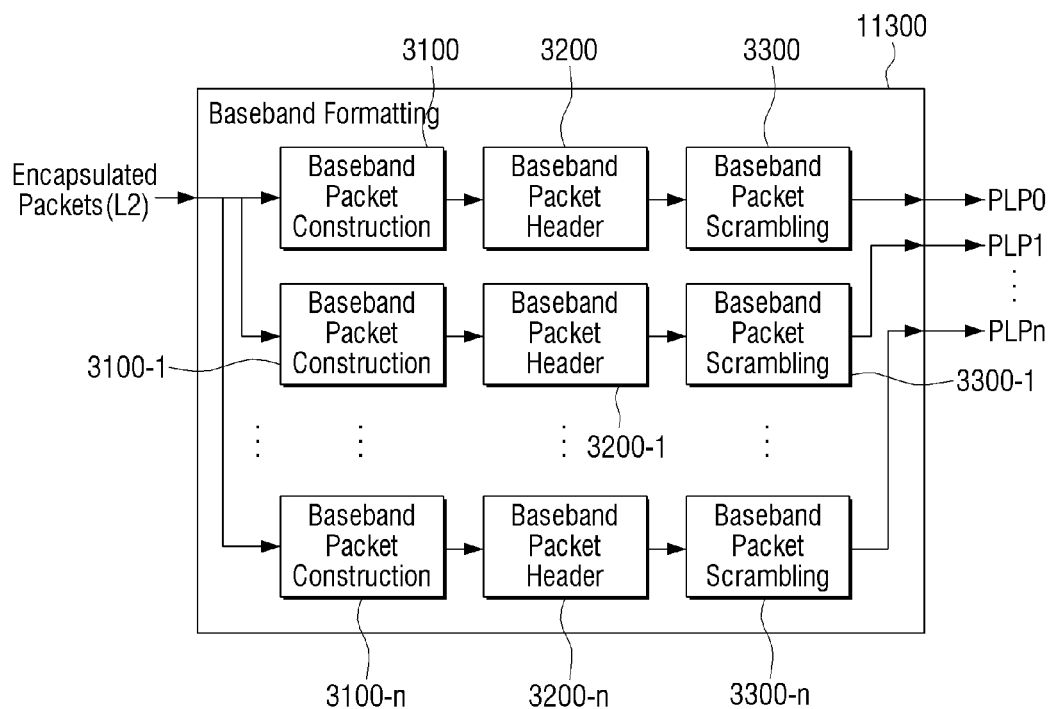

The baseband formatting block 11300 includes baseband packet construction blocks 3100, 3100-1, . . . , 3100-*n*, baseband packet header construction blocks 3200, 3200-1, . . . , 3200-*n*, and baseband packet scrambling blocks 3300, 3300-1, . . . , 3300-*n*, as illustrated in FIG. 5A. In an M-PLP operation, the baseband formatting block generates a plurality of PLPs as necessary.

Figure 5B:
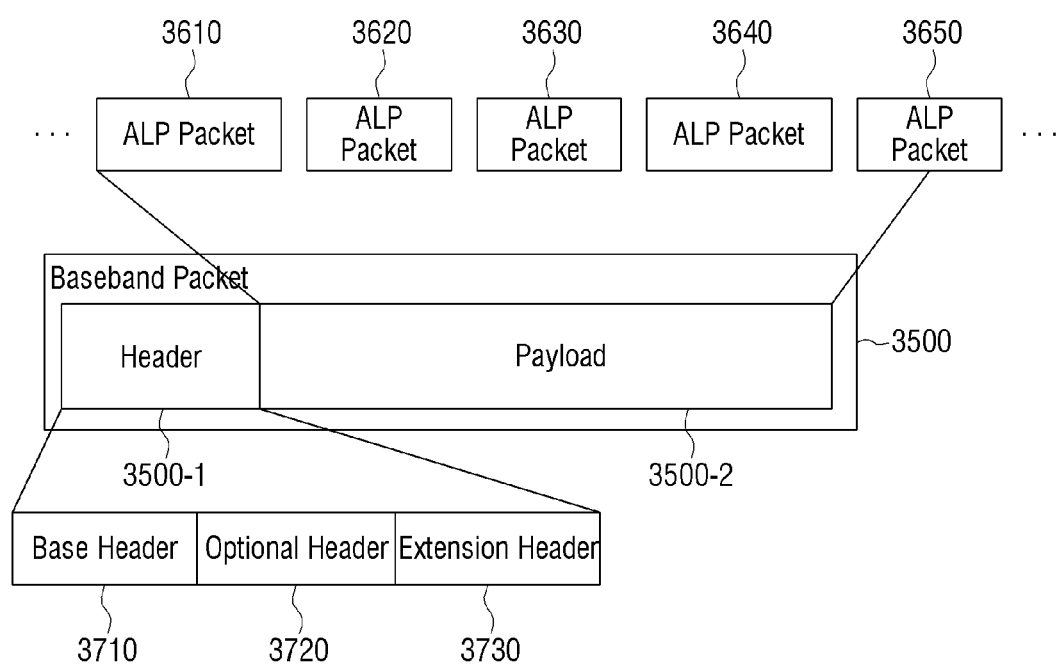

The baseband packet construction blocks 3100, 3100-1, . . . , 3100-*n* construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-*n* construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Here, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and, for example, used for a baseband packet counter, baseband packet time stamping, additional signaling, and the like.

The baseband packet scrambling blocks 3300, 3300-1, . . . , 3000-*n* scramble the baseband packet.

Like a case in which payload data mapped to a constellation is configured by a repetitive sequence, the payload data is continuously scrambled before direction error correction encoding so as to prevent continuous mapping to the same point.

Figure 6:
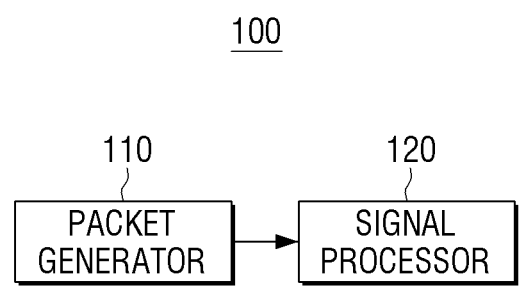
FIG. 6 illustrates a configuration of a transmitting apparatus according to an exemplary embodiment.

FIG. 6 is a block diagram illustrating a configuration of a transmitting apparatus according to an exemplary embodiment of the present disclosure.

Referring to FIG. 6, the transmitting apparatus 100 includes a packet generator 110 and a signal processor 120.

The packet generator 110 may encapsulate an IP packet, a TS packet, and various types of data to generate packets and transmit these packets to respective PLPs. Here, the packets correspond to L2 packets in an ISO 7 layer model.

In detail, the packet generator 110 may generate a packet including a header and a payload (also referred to as a data payload), for example, an ALP packet (also referred to as a generic packet or an L2 packet) from an input stream. Here, the header may include information on the payload included in a corresponding packet and information on a packet included in the corresponding packet. Hereinafter, the packet generated by the packet generator 110 will be referred to as the ALP packet for easy description.

In general, the payload of the ALP packet may include at least one of an IP packet, a TS packet, and a signaling packet. Data included in the payload is not limited to a particular example and the payload may include various types of data including media data. Here, the ALP packet may be regarded as a unit packet required for mapping various types of data to the physical layer.

As described later in detail in reference to FIGS. 7 and 8A, the ALP packet may include a header formed of a base header, an additional header and an optional header. The base header may include first to third fields. The first field may represent a packet type of an input stream, and when the first field is set to a value indicating that the packet type of the input stream is a TS packet, the second field may indicate the number of TS packets included in the payload, and a third field may be set to a first value indicating that there is no additional header or a second value indicating that there is an additional header.

Further, when the third field is set to the second value, the additional header may include a fourth field indicating the number of deleted null packets with respect to each of at least one TS packet group constituted by consecutive TS packets. Here, the null packets deleted with respect to each TS packet group may be null TS packet which immediately precedes the first TS packet included in each TS packet group among a plurality of packets included in the input stream. According to an exemplary embodiment, however, the null packets deleted with respect to each TS packet group may be null TS packet which immediately follows the last TS packet included in each TS packet group among a plurality of packets included in the input stream. When the number of TS packet groups included in the payload of the ALP packet is one, the fourth field may include only the number of deleted null TS packets in this single TS group.

Meanwhile, the third field may be set to the second value when there is a deleted null TS packet or when TS header (alternatively referred to as TS packet header) compression is applied.

Further, when the third field is set to the second value, the additional header may include a fifth field indicating whether the TS header compression is applied.

Herein, the fourth field is implemented by a 7-bit field, and when the fifth field is set to a fourth value indicating that the TS header compression is not applied, the fourth field may be set to 0 in the case where 128 null packets are deleted. Further, when the fifth field is set to a fifth value indicating that the TS header compression is applied, the fourth field may be set to 0 when no TS null packet is deleted.

The signal processor 120 may signal-process the ALP packet generated by the packet generator 110. Here, the signal processor 130 may perform all signal processing processes after the generation of the ALP packet and for example, perform all signal processing processes of the generation of a baseband packet to the generation of a transmission frame.

Figure 7:
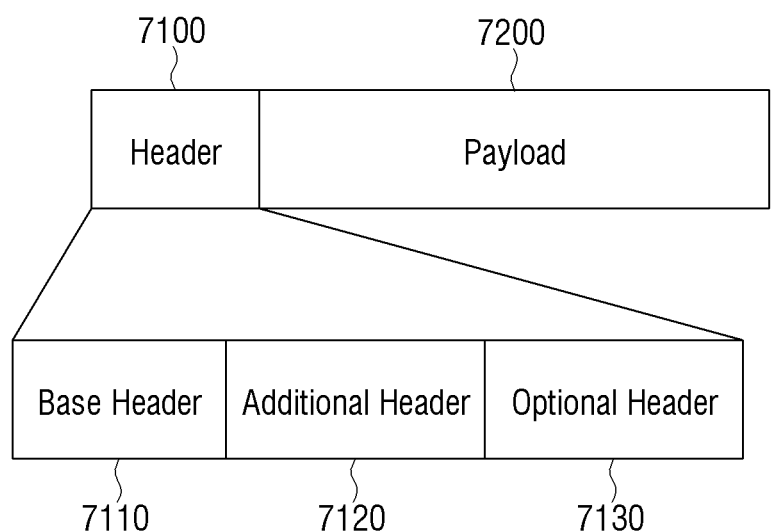
FIG. 7 illustrates an ATSC 3.0 link-layer protocol (ALP) packet structure according to an exemplary embodiment.

FIG. 7 is a diagram illustrating an ALP packet structure according to an exemplary embodiment.

Referring to FIG. 7, an ALP packet includes a header 7100 and a payload 7200. The header 7100 may include a base header 7110, an additional header 7120 and an option header 7130. The ALP packet header 7100 always includes the base header 7110, and whether the additional head 7120 is present in the header 7100 may vary depending on a control field value of the base header 7110. Further, whether the option header 7130 is present may be selected by using a control field of the additional header 7130.

Figure 8A:
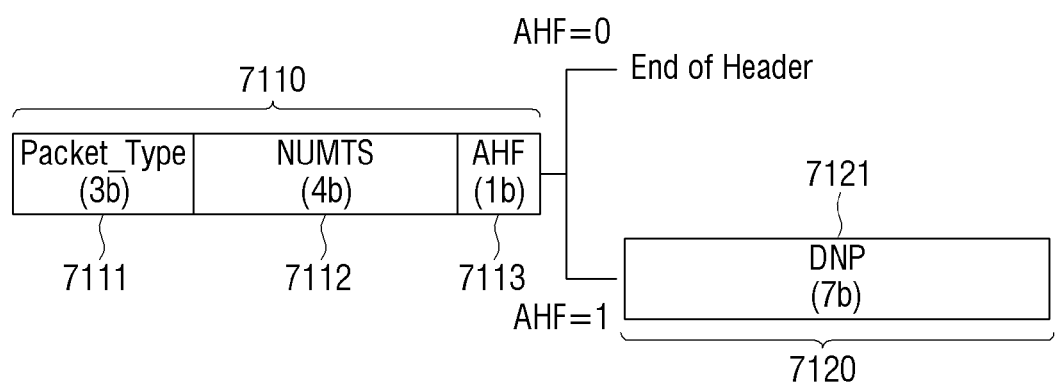
FIGS. 8A and 8B illustrate a structure of a header structure of an ALP packet according to exemplary embodiments.

FIG. 8A is a diagram illustrating a header structure of an ALP packet according to an exemplary embodiment.

A Packet_Type field 7111 corresponds to the first field of the base header 7110 as described above, and is a 3-bit field indicating a protocol applied to the input packet or a packet type of the input packet before encapsulation into the ALP packet. As one example, the Packet_Type field 7111 may be encoded according to Table 1 given below.

TABLE 1

| Packet_Type Value | Meaning |
|---|---|
| 000 | IPv4 packet |
| 001 | Reserved |
| 010 | Compressed IP packet |
| 011 | Reserved |
| 100 | Link layer signaling packet |
| 101 | Reserved |
| 110 | Packet Type Extension |
| 111 | MPEG-2 Transport Stream |

When the Packet_Type field 7111 is set to a value "111" indicating an MPEG-2 TS packet, the base header 7110 includes a Number of TS packets (NUMTS) field 7112. Here, the base header 7110 also includes an Additional Header Flag (AHF) field 7113. That is, the header structure of the ALP packet illustrated in FIG. 8A is a header structure when the input stream is the MPEG-2 TS packet.

A Number of TS packets (NUMTS) field 7112 corresponds to the second field of the base header 7110 as described above, and is a 4-bit field indicating the number of TS packets included in the payload of the ALP packet. NUMTS='0' may indicate that 16 packets are transmitted in the payload of the ALP packet, and NUMTS of all other values may indicate TS packets of the same number, i.e., the same values. For example, NUMTS='0001' indicates that one TS packet is transmitted. However, according to another implementation example, NUMT=k may indicate that k+1 TS packets are transmitted in the payload of the ALP packet.

An Additional Header Flag (AHF) field 7113 corresponds to the third field of the base header 7110 as described above, and is a 1-bit field indicating whether the additional header is present. A value "0" indicates that the additional header is not present and a value "1" that the additional header 7120 is present after the base header 7110. Here, the additional header may be implemented by 1 byte. The AHF field 7113 may be set to the value "1" when the null TS packet is deleted or when the TS header compression (alternatively referred to as TS header deletion) is applied. That is, the additional header 7120 for the TS packet encapsulation is constituted by a Deleted Null Packet (DNP) field 7121 and a Header Deletion Mode (HDM) field 7122, and is present only when the AHF field 7113 is set to the value "1".

The ALP packet provides an overhead reduction mechanism for the MPEG-2 TS packet for improving transmission efficiency. In detail, a sync byte (0x47) of each TS packet is continuously deleted. As a result, the length of the MPEG-2 TS packet encapsulated in the payload of the ALP packet continuously becomes not 188 bytes, which is an original length, but 187 bytes.

Further, the null TS packet deletion may be applied. In detail, in order to avoid unnecessary transmission overhead, the null TS packet (PID=0x1FFF) may be deleted, and the deleted null TS packet may be restored by a receiver side by using the DNP field 7121.

The DNP field 7121 corresponds to the fourth field as described above, and indicates the number of deleted null TS packets. Here, the deleted null TS packet may be at least one null TS packet which immediately precedes the first TS packet or which immediately follows the last TS packet in each TS packet group included in the payload of the ALP packet among a plurality of packets included in the input stream.

Figure 8B:
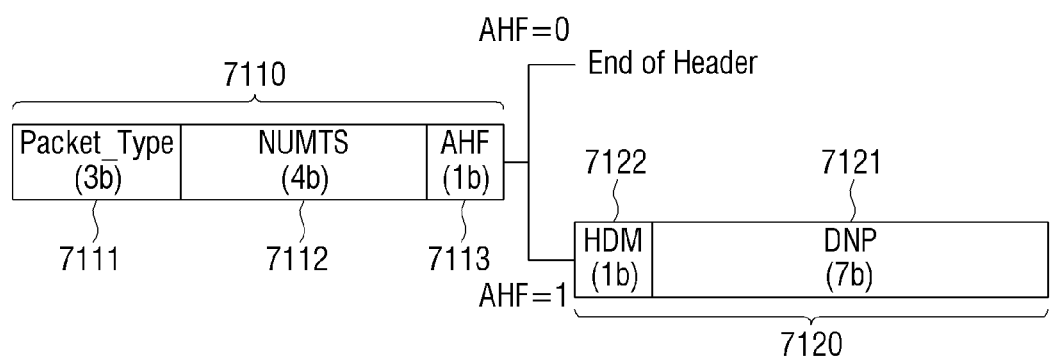

FIG. 8B is a diagram illustrating a header structure of an ALP packet according to another exemplary embodiment.

As an overhead reduction mechanism for the MPEG-2 TS packet for improving transmission efficiency, the TS header compression may be selectively applied. At least two consecutive TS packets have continuity counter fields which are sequentially increased and when the header is the same across the TS packets, the header may be transmitted once in a first packet and the other headers may be deleted.

When three overhead reduction mechanisms are performed, overhead reduction may be sequentially performed in the order of sync byte deletion, null packet deletion, and common header deletion. A syntax of MPEG-2 TS encapsulation is shown in Table 2.

TABLE 2

| Syntax | No. of bits | Format |
|---|---|---|
| ATSC3.0_link_layer_packet( ) { | | |
|     packet_type | 3 | '111' |
|     NUMTS | 4 | uimsbf |
|     AHF | 1 | bslbf |
|     if (AHF =="1") { | | |
|         HDM | 1 | bslbf |
|         DNP | 7 | uimsbf |
|     } | | |
| } | | |

An HDM field 7122 corresponds to the fifth field of a base header 7110 as described above, and is a 1-bit field indicating whether the TS header compression is applied to the ALP packet. The value "1" indicates that the TS header compression is applied to the ALP packet, and the value "0" indicates that the TS header compression is not applied.

Meanwhile, a maximum of 128 null packets may be deleted. When the value of the HDM field 7122 is "0", the value "0" of a DNP field 7121 indicates that 128 null TS packets are deleted. When the value of the HDM field 7122 is "1", the value "0" of the DNP field 7121 indicates that the null TS packets are not deleted. The value "0" of the HDM field 7122 indicates that the TS header compression is not applied, and the null TS packets are deleted.

An additional header 7120 is present when an AHF field 7113 is set to the value "1", which also means that the null TS packet is deleted or the TS header compression is applied. As a result, when the value of the HDM field 7122 is "0", since the value of the DNP field 7121 need not indicate whether the null TS packets are deleted, the value "0" in the HDM field 7122 indicates that 128 null TS packets are deleted. On the contrary, when the value of the HDM field 7122 is "1", at least one null TS packet may be deleted or not. As a result, when the value of the HDM field 7122 is "1", the value "0" of the DNP field 7121 indicates that the null TS packets are not deleted.

All values of the DNP field 7121 other than the value "0" are the same as the number of deleted null TS packets. For example, "5" which is a value of the DNP field 7121 indicates that 5 null packets are deleted.

The AHF field 7113 corresponds to the third field of the base header 7110 as described above, and is a 1-bit field indicating whether the additional header is present. A value "0" indicates that the additional header is not present, and a value "1" indicates that the additional header 7120 is present after the base header 7110. Here, the additional header may be implemented by 1 byte. The AHF field 7113 may be set to the value "1" when the null TS packet is deleted or when the TS header compression is applied.

That is, the additional header 7120 for TS packet encapsulation includes the HDM field 7122 and the DNP field 7121, and is present only when the AHF field 7113 is set to the value "1".

The HDM field 7122 corresponds to the fifth field as described above, and is a 1-bit field indicating whether the TS header compression is applied to the ALP packet. The value "1" indicates that the TS header compression is applied to the ALP packet, and the value "0" indicates that the TS header compression is not applied.

The DNP field 7121 corresponds to the fourth field, and indicates the number of deleted null TS packets. Here, the deleted null TS packet may be at least one null TS packet which immediately precedes the first TS packet or immediately follows the last TS packet in each TS packet group included in the payload of the ALP packet among a plurality of packets included in the input stream.

A maximum of 128 null packets may be deleted. When the value of the HDM field 7122 is "0", the value of the DNP field 7121 of "0" indicates that 128 null TS packets are deleted. When the value of the HDM field 7122 is "1", the value of the DNP field 7121 of "0" indicates that the null TS packets are not deleted. Sine the value of the HDM field 7122 of "038 indicates that the TS header compression is not applied, the value "0" indicates that the null TS packets are particularly deleted.

Figure 9:
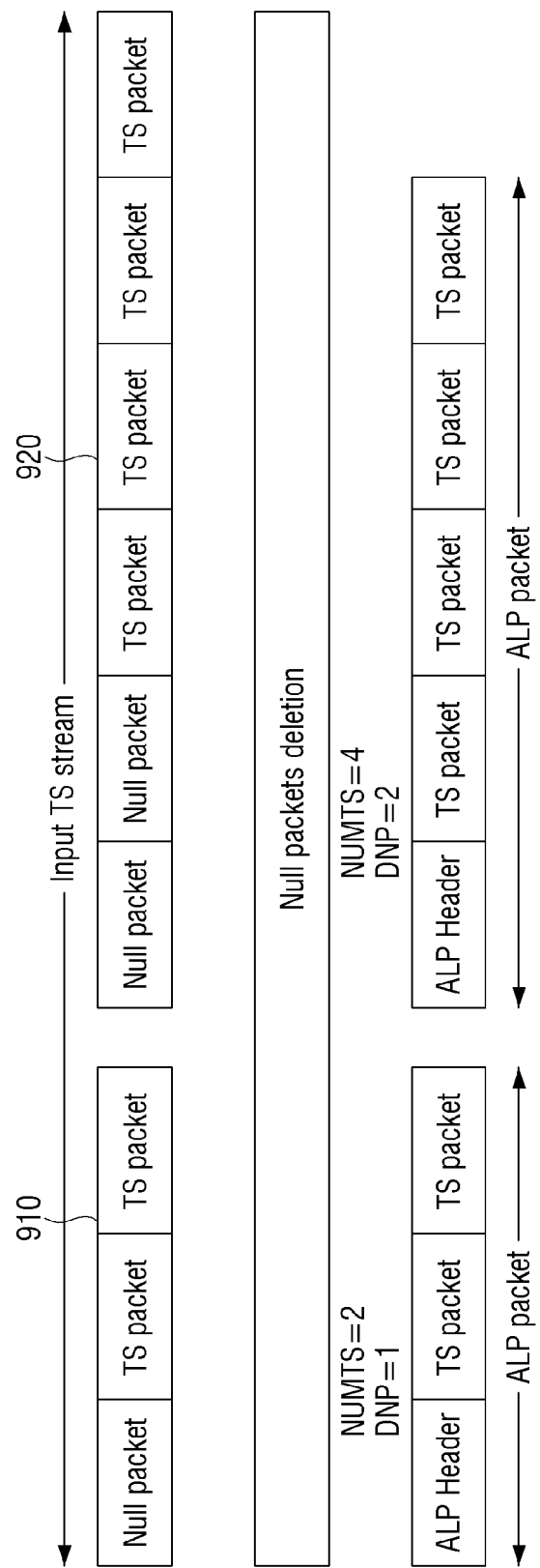
FIG. 9 illustrates a null packet deletion mechanism according to an exemplary embodiment.

FIG. 9 is a diagram for describing a null packet deletion mechanism according to an exemplary embodiment.

According to a transmission stream rule, a bit rate is required to be the same at an output of a multiplexer of a transmitting apparatus and an input of a demultiplexer of a receiving apparatus, and an end-to-end delay is also required to be the same at the transmitting apparatus and the receiving apparatus. In the case of some transmission stream input signals, a null packet may be present in order to receive a variable bit rate service in a predetermined bit rate stream. In this case, in order to prevent unnecessary transmission overhead, a null TS packet (PID=0x1FFF) may be deleted. A process in which the deleted null TS packet is reinserted into the original location in the receiving apparatus is performed, and as a result, a predetermined bit rate may be guaranteed and the need of Program Clock Reference (PCR) time stamp update may be prevented.

Before generating an ALP packet, a counter called DNP is reset to zero and increases with respect to respective deleted null TS packets prior to encapsulation into the ALP packet.

A group of consecutive valid TS packets is encapsulated into a payload of the ALP packet, and each field value of a header is determined. After the generated ALP packet is injected into a physical layer, the DNP is reset to zero. In the case where the DNP reaches a maximum value, when a next packet is also a null packet, this null packet is regarded as a valid packet and encapsulated into the payload of the next ALP packet. Each ALP packet includes at least one valid TS packet in the payload.

FIG. 9 illustrates HDM='0' and AHF='1' with respect to two ALP packets. In a first ALP packet 910, one null packet is deleted before two valid TS packets are transmitted to the ALP packet 910. When the next packet is a null packet, the ALP packet 910 is completed and the DNP counter is reset to zero. In a header of the ALP packet 910, NUMT='2' and DNP='1'. In a second ALP packet 920, two null packets are deleted before four valid TS packets are transmitted to the ALP packet 920. In this case, in a header of the corresponding ALP packet 920, NUMT='4' and DNP='2'.

Figure 10A:
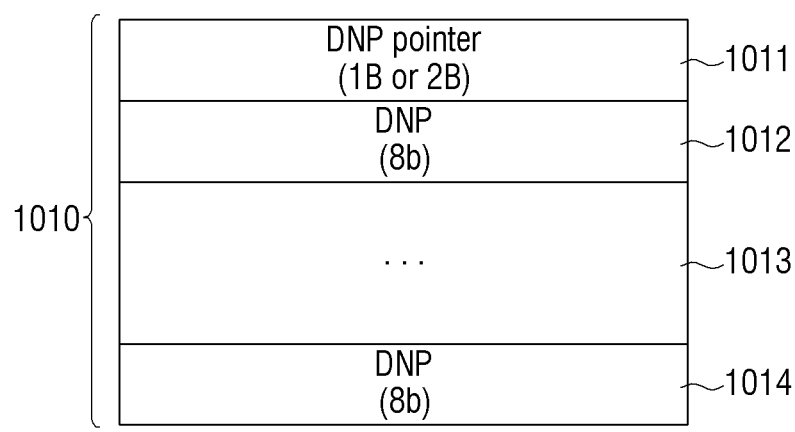
FIGS. 10A and 10B illustrate a null packet deletion mechanism according to exemplary embodiments.
Figure 10B:
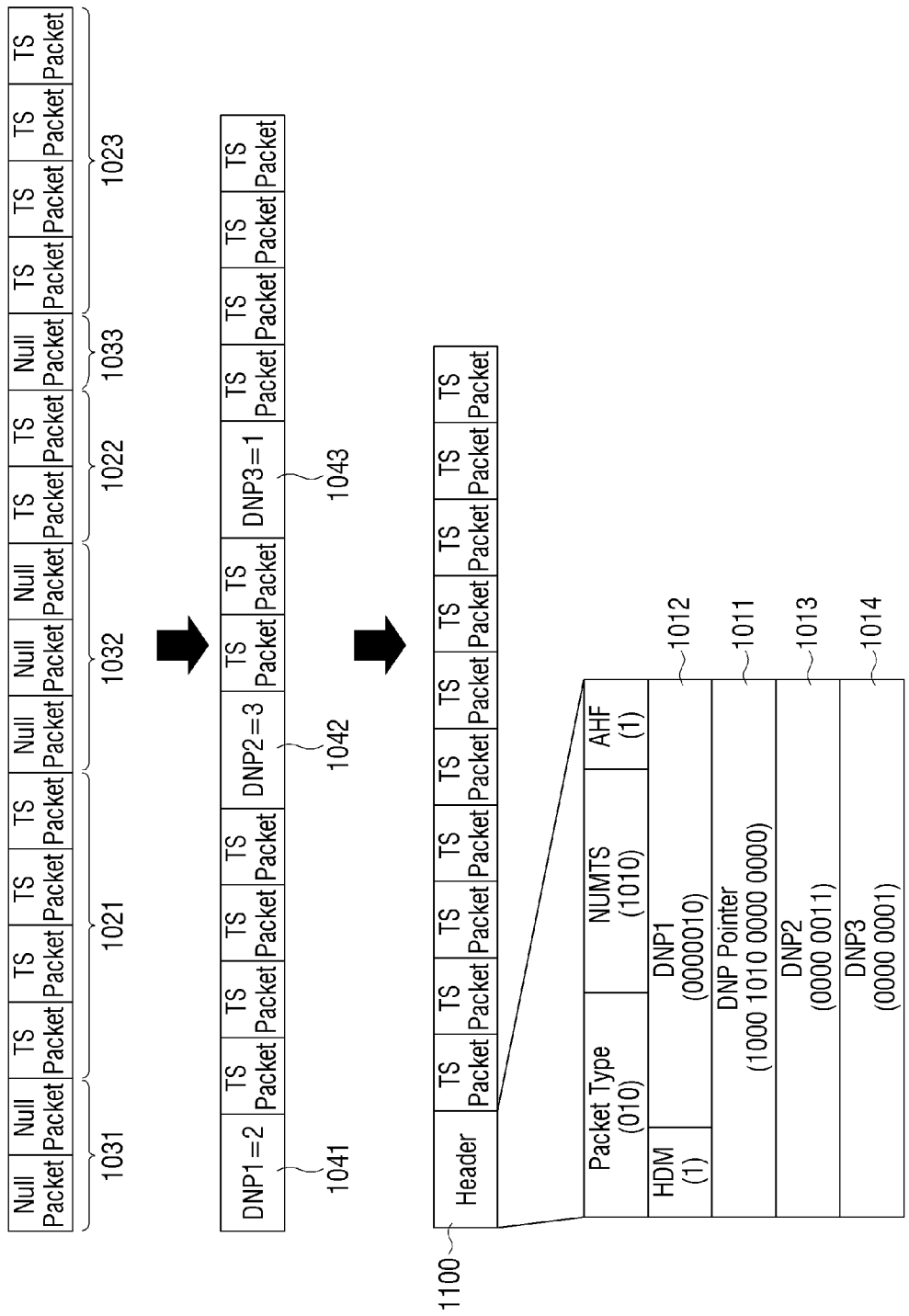

FIGS. 10A and 10B illustrate a null packet deletion mechanism according to exemplary embodiments.

As illustrated in FIGS. 10A and 10B, a DNP field 1010 may include the number of deleted null packets with respect to each of a plurality of TS packet groups constituted by consecutive TS packets. Here, deleted null packets with respect to respective TS packet groups 1021, 1022 and 1023 may be null packet groups 1031, 1032 and 1033 including a plurality of null TS packets subsequently preceding a first TS packet included in each of the TS packet groups among a plurality of packets included in an input stream.

A DNP pointer field 1011 is a field indicating whether a null packet deleted with respect to each TS packet group is present. An i-th bit of the DNP pointer field indicates whether a null TS packet deleted before an i-th TS packet in a payload of an ALP packet is present. For example, when the number of valid TS packets transmitted in an ALP packet is 8 or less, the DNP pointer field 1050 may become 1 byte. Further, when the number of valid TS packets transmitted in an ALP packet is greater than 8 but equal to or less than 16, the DNP pointer field 1011 may become 2 bytes.

DNP fields 1012, 1013 and 1014 indicate the numbers of null TS packets deleted with respect to deleted consecutive null TS packet groups, respectively. For example, each of the DNP fields 1012, 1013 and 1014 may be implemented as 8 bits.

As illustrated in FIG. 10B, the numbers 1041, 1042 and 1043 of null packets 1031, 1032 and 1033 deleted with respect to three TS packet groups 1021, 1022 and 1023 each being constituted by consecutive valid TS packets, respectively, are counted, and the numbers of null packets which are counted may be included in the DNP fields 1012, 013 and 1014 of an ALP packet header 1100, respectively. Here, the null packets 1031, 1032 and 1033 deleted with respect to the respective TS packet groups 1021, 1022 and 1023 may be null packet groups 1031, 1032 and 1033 including null TS packets subsequently preceding a first TS packet included in each of the TS packet groups among a plurality of packets included in an input stream.

Figure 11:
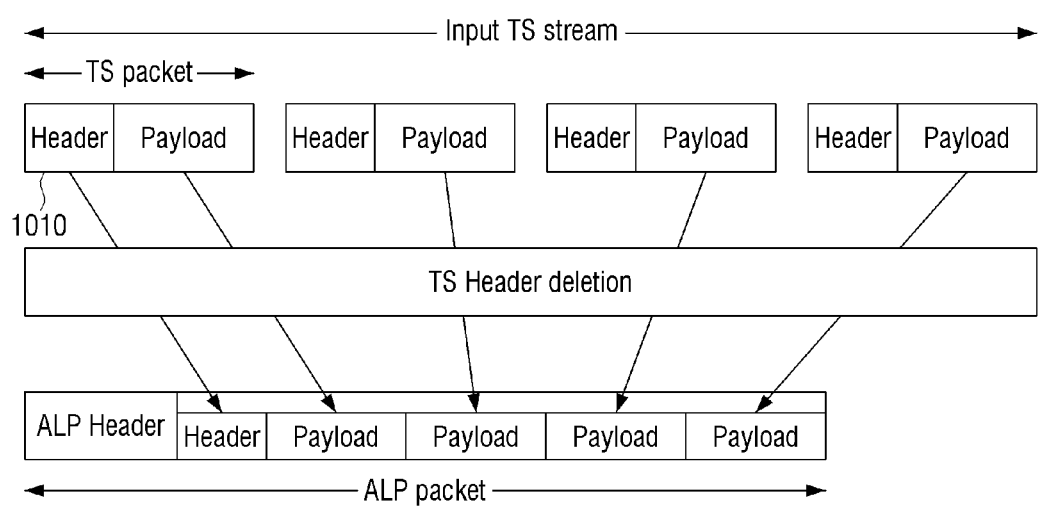
FIG. 11 illustrates a TS header compression mechanism according to another exemplary embodiment.

FIG. 11 illustrates a TS header compression mechanism according to another exemplary embodiment.

At least two consecutive TS packets sequentially increase consecutive counter fields, and when the header fields of these TS packets are the same, that is, redundant, the header is transmitted once in the first TS packet and the other headers are deleted. When a duplicated MPEG-2 TS packet is included in at least two consecutive TS packets, header compression is applied at a transmitter side. An HDM field indicates whether the header compression is performed. When a TS packet header is deleted, the HDM field is set to "1".

FIG. 11 illustrates an exemplary embodiment when three TS packets have the same header field and NUMT='4'.

While AHF='1', HDM='1' and NDP='0'. That is, in this case, TS header compression is applied and null packet deletion is not applied. In a receiver side, the deleted packet header is recovered by using a first packet (1010) header and a consecutive counter is sequentially increased and restored from the first header.

Figure 12:
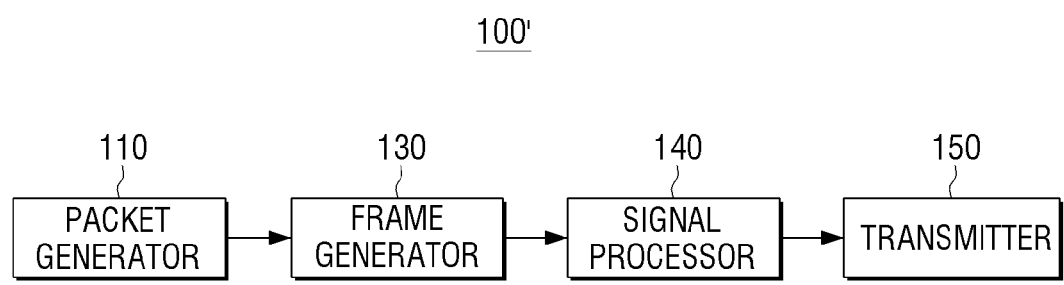
FIG. 12 illustrates a configuration of a transmitting apparatus according to another exemplary embodiment.

FIG. 12 is a block diagram illustrating a configuration of a transmitting apparatus according to another exemplary embodiment. Referring to FIG. 12, the transmitting apparatus 100' includes a packet generator 110, a frame generator 130, a signal processor 140, and a transmitter 150. Among the components illustrated in FIG. 12, since the constitution of the packet generator 110 is the same as the constitution of the packet generator 110 illustrated in FIG. 6, a detailed description will be omitted.

The packet generator 110 generates a packet, for example, an ALP packet (generic packet) as described above.

The frame generator 130 may generate a frame including the ALP packet generated by the packet generator 110. Herein, the generated frame may be a baseband packet (BBP) (alternatively referred to as a layer 1 (L1) packet) including the ALP packet. Here, the terms to describe the transmitting apparatus of FIG. 12 may vary according to a system design. For example, the ALP packet and the BBP packet may be referred to as a BBP packet and a baseband frame (BBF), respectively, in another system.

In detail, the frame generator 130 arranges a plurality of ALP packets including a TS packet or an IP packet and a header to generate the arranged ALP packets as a baseband packet having a size corresponding to an FEC code. The ALP packets according to the exemplary embodiment may be TS packets, but the same process may be applied to various types of data as well as the TS packets.

Figure 13:
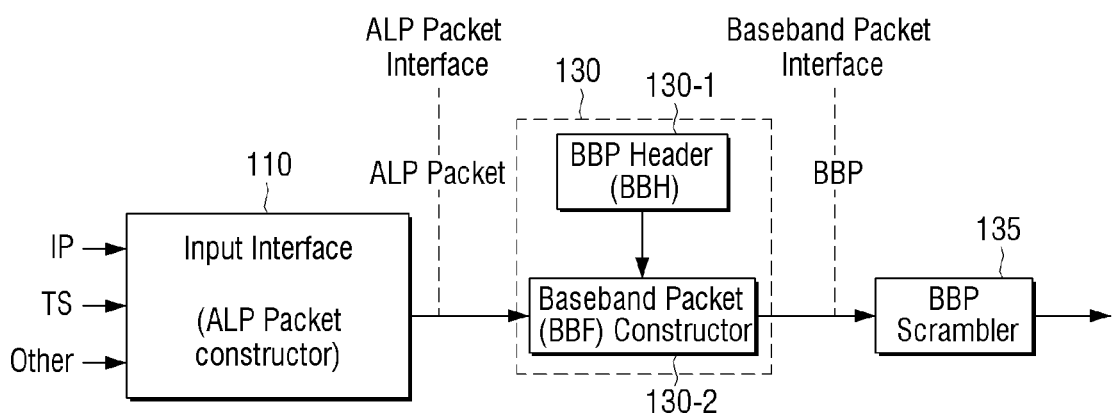
FIG. 13 illustrates a detailed configuration of a frame generator according to an exemplary embodiment.

FIG. 13 is a block diagram illustrating a detailed configuration of a frame generator according to an exemplary embodiment.

Referring to FIG. 13, the frame generator 130 may include a baseband header generator 130-1 and a baseband packet generator (also referred to as a baseband packet constructor) 130-2. In addition, the baseband packet generator 130-2 may transmit a generated baseband packet to a baseband packet scrambler 135.

The baseband header generator 130-1 may generate a header inserted into the baseband packet. Here, the header inserted into the baseband packet is referred to as a baseband header and the baseband header includes information on the baseband packet.

In particular, the baseband header generator 130-1 may generate the baseband header including information on the number of TS packets in an ALP packet, the number of deleted null packets, and the like when an input stream is a TS. Besides, the baseband header generated by the baseband header generator 130-1 may include various information and this will be described below.

Further, the baseband packet generator 130-2 encapsulates the baseband header generated from the baseband header generator 130-1 and ALP packets output from the packet generator 110 to generate a baseband packet.

In addition, the baseband packet scrambler 135 mixes data stored in the baseband packet in a random order before an FEC code is applied to the baseband packets to generate a scrambled baseband packet. The scrambled baseband packet is transmitted through at least one PLP and signal-processed. In this case, one PLP may be constituted by baseband packets having a fixed size. That is, the input stream may be encapsulated to a baseband packet for one PLP.

The PLP means a signal path which is independently processed. That is, respective services (for example, video, extension video, audio, a data stream, and the like) may be transmitted and received through multiple RF channels and the PLP is a path through which the services are transmitted or a stream transmitted through the path. Further, the PLP may be positioned at slots distributed on multiple RF channels with a time interval or distributed on one RF channel with a time interval. That is, one PLP may be transmitted while being distributed on one RF channel or multiple RF channels with a time interval.

A PLP structure is constituted by Input mode A providing one PLP and Input mode B providing multiple PLPs, and, in particular, when the PLP structure supports Input mode B, the PLP structure may provide a strong specific service and a time interleaving length is increased by distributing and transmitting one stream to acquire a time diversity gain. Further, when only a specific stream is received, a power supply of a receiver may be turned off for a residual time to be used with low power, and as a result, the receiver is suitable for providing a portable and mobile broadcasting service.

The time diversity is a technology that when a transmitting side transmits the same signal with a predetermined time interval several times in order to reduce deterioration of a transmission quality in a mobile communication transmission path, a receiving side synthesizes the received signals again to acquire an excellent transmission quality.

Further, information which may be commonly transmitted to a plurality of PLPs is transmitted through one PLP to increase transmission efficiency and PLP0 performs such a role. When the PLP is referred to as a common PLP and PLPs other than PLP0 may be used for data transmission and these PLPs are referred to as a data PLP. When such PLPs are used, a home high-definition TV (HDTV) program may be received and, in a mobile situation, a standard definition TV (SDTV) program may be provided to mobile devices. Further, various broadcasting services may be provided to a viewer through a broadcasting station or a broadcasting content provider, and differentiated broadcasting services may be provided to receivers located even in a fringe area where service reception is very difficult.

Figure 14:
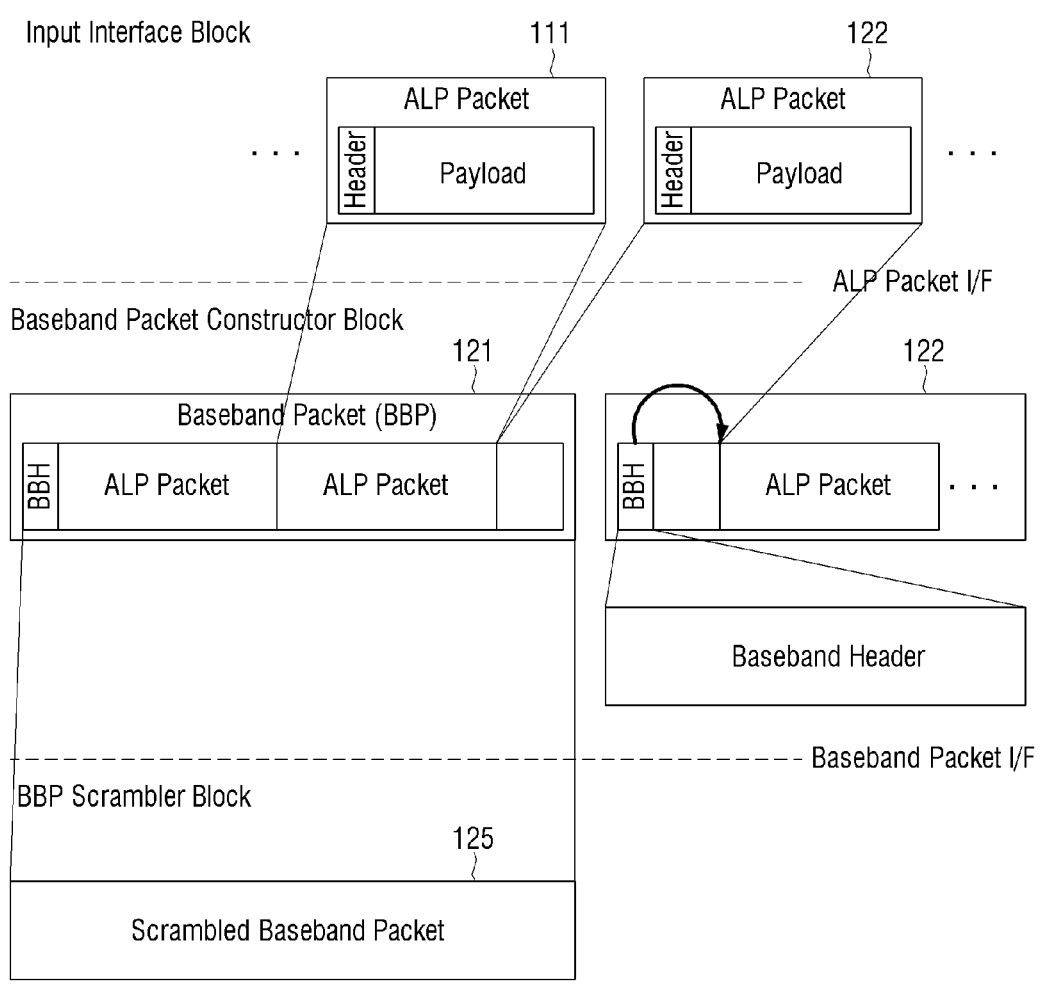
FIG. 14 illustrates an ALP packet, a baseband packet, and a scrambled baseband packet according to an exemplary embodiment.

Meanwhile, FIG. 14 is a diagram illustrating an ALP packet, a baseband packet, and a scrambled baseband packet according to an exemplary embodiment.

Referring to FIG. 14, when the packet generator 110 stores at least one TS or IP packet in a payload and inserts a header to generate a plurality of ALP packets 111 and 112, the frame generator 130 groups the plurality of generated ALP packets 111 and 112, and inserts a baseband header to generate a plurality of baseband packets 121 and 122. Here, the respective baseband packets 121 and 122 may include a plurality of ALP packets and further, may include some of an ALP packet.

The baseband packet scrambler 135 randomly scrambles the respective generated baseband packets 121 and 122 to generate a plurality of scrambled baseband packets, for example, a scrambled baseband packet 125-1. In addition, the generated scrambled baseband packet 125-1 may be transmitted to at least one PLP as described above and subjected to signal processing for adding an FEC code.

Referring back to FIG. 12, the signal processor 140 may signal-process the generated baseband packet which may be a scrambled baseband packet.

In detail, the signal processor 140 signal-processes the baseband packet to generate a transmission frame.

Further, the signal processor 140 may insert signaling information into a signaling area of a frame. Herein, the signaling information may be called an L1 signaling signal for frame synchronization. A preamble into which the L1 signaling information is inserted may include an L1 pre signaling area and an L1 post signaling area.

Meanwhile, although not illustrated, the signal processor 140 may perform functions corresponding to bit the BICM blocks 12000 and 12000-1 and the framing/interleaving blocks 13000 and 13000-1 illustrated in FIG. 3A to 3C.

The transmitter 150 may transmit the signal-processed frame to a receiving apparatus (not illustrated).

In detail, the transmitter 150 may perform functions corresponding to the waveform generation blocks 14000 and 14000-1 illustrated in FIGS. 3A to 3C. That is, the transmitter 140 performs modulation for modulating the generated frame to an RF signal and transmits the RF signal to the receiving apparatus.

Hereinafter, a TS packet encapsulation mechanism according to various exemplary embodiments will be described in detail with reference to the accompanying drawings. However, detailed description about parts which are redundant with those about the aforementioned parts will be omitted.

Figure 15:
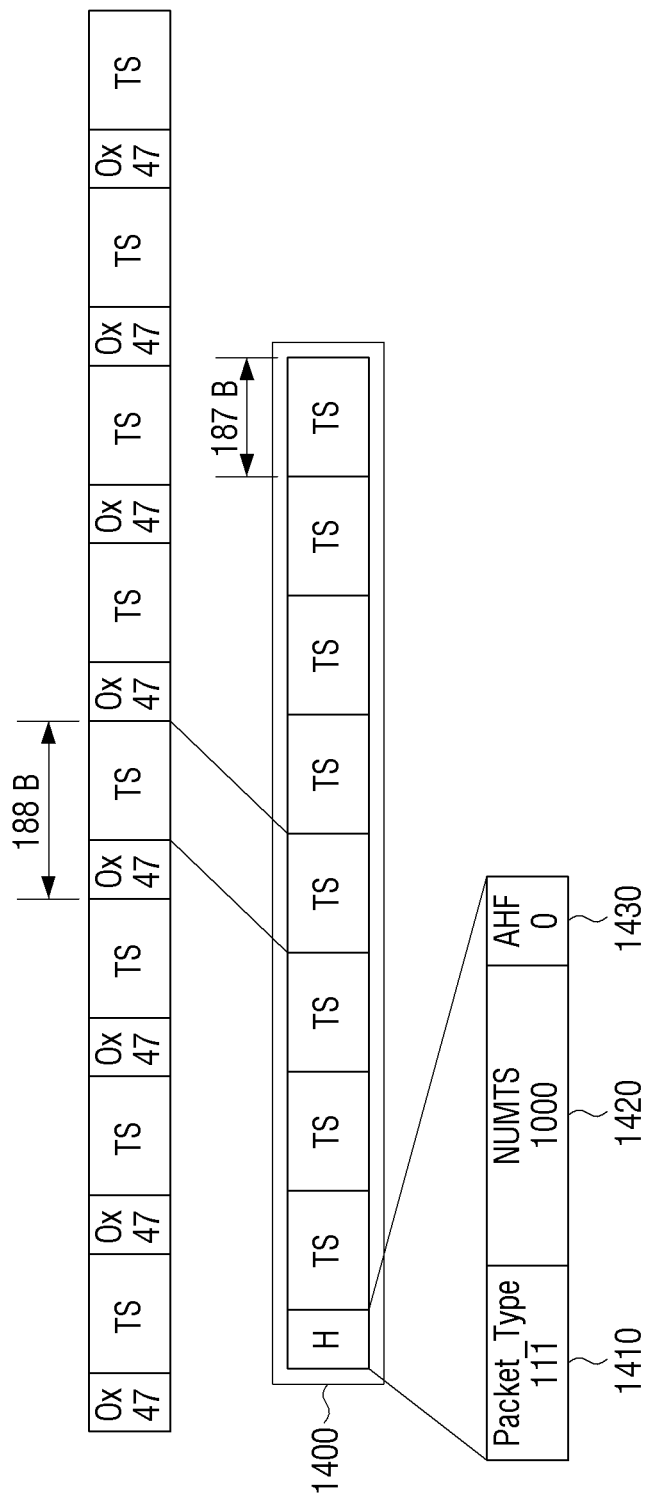
FIG. 15 illustrates a TS packet encapsulation mechanism according to an exemplary embodiment.

FIG. 15 is a diagram for describing a TS packet encapsulation mechanism according to an exemplary embodiment.

As described above, an ALP packet may transmit an MPEG-2 TS packet without a sync byte in a payload. FIG. 15 illustrates an ALP packet including eight MPEG-2 TS packets. An encapsulation process is described below:

The sync byte for the MPEG-2 TS packet is deleted for encapsulation. As a result, the length of the MPEG-2 TS packet decreases from 188 bytes to 187 bytes.

Eight MPEG-2 TS packets are grouped to a payload of an ALP packet. In this case, the length of the payload becomes 187×8=1,496 bytes.

An ALP header, i.e., a base header of an ALP packet header, having a length of 1 byte is generated. Here, the ALP header has a value of packet_type (1410)='111', NUMTS (1420)='1000', AHF (1430)='0'.

In the ALP packet generated as described above, 7 bytes are saved as compared with a case in which eight MPEG-2 TS packets are directly transmitted to a PHY layer.

Figure 16A:
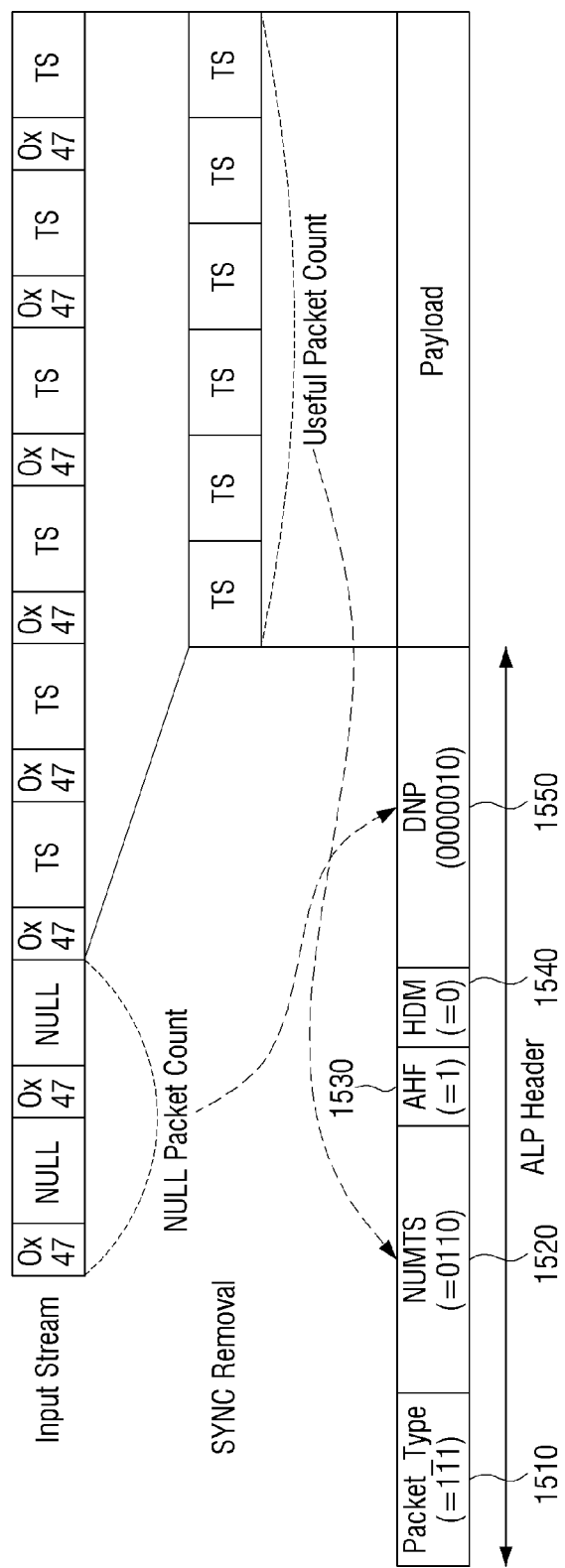
FIG. 16A illustrates a TS packet encapsulation mechanism according to another exemplary embodiment.

FIG. 16A is a diagram for describing a TS packet encapsulation mechanism according to another exemplary embodiment.

As described above, an ALP packet may be generated by deleting at least one null MPEG-2 TS packet disposed immediately before the first MPEG-2 TS packet encapsulated into the ALP packet, and a receiver may know the number of null MPEG-2 TS packets deleted through a header of the ALP packet. FIG. 16A illustrates an example of an ALP packet including six MPEG-2 TS packets when two null MPEG-2 TS packets are deleted disposed immediately before the first MPEG-2 TS packet in a payload. The encapsulation process is described below.

At least one null packet is deleted and counted.

At least one sync byte of at least one MPEG-2 TS packet is deleted for encapsulation. As a result, the length of an MPEG-2 TS packet decreases from 188 bytes to 187 bytes.

Six MPEG-2 TS packets are grouped to a payload of an ALP packet. In this case, the length of the payload becomes 187×6=1,122 bytes.

An ALP header, i.e., a base header of an ALP packet header, having a length of 2 bytes is generated. Here, the ALP header has a value of packet_type (1510)= '111', NUMTS (1520)='0110', AHF (1530)='1', HDM (1540)='0', DNP (1550)='0000010'. In this case, AHF='1' indicates that at least two consecutive null packets are deleted disposed immediately before the first TS packet encapsulated into a payload.

The length of the ALP packet generated as described above is 1,124 bytes and 380 bytes are saved as compared with a case in which six MPEG-2 TS packets are directly transmitted to a PHY layer.

Figure 16B:
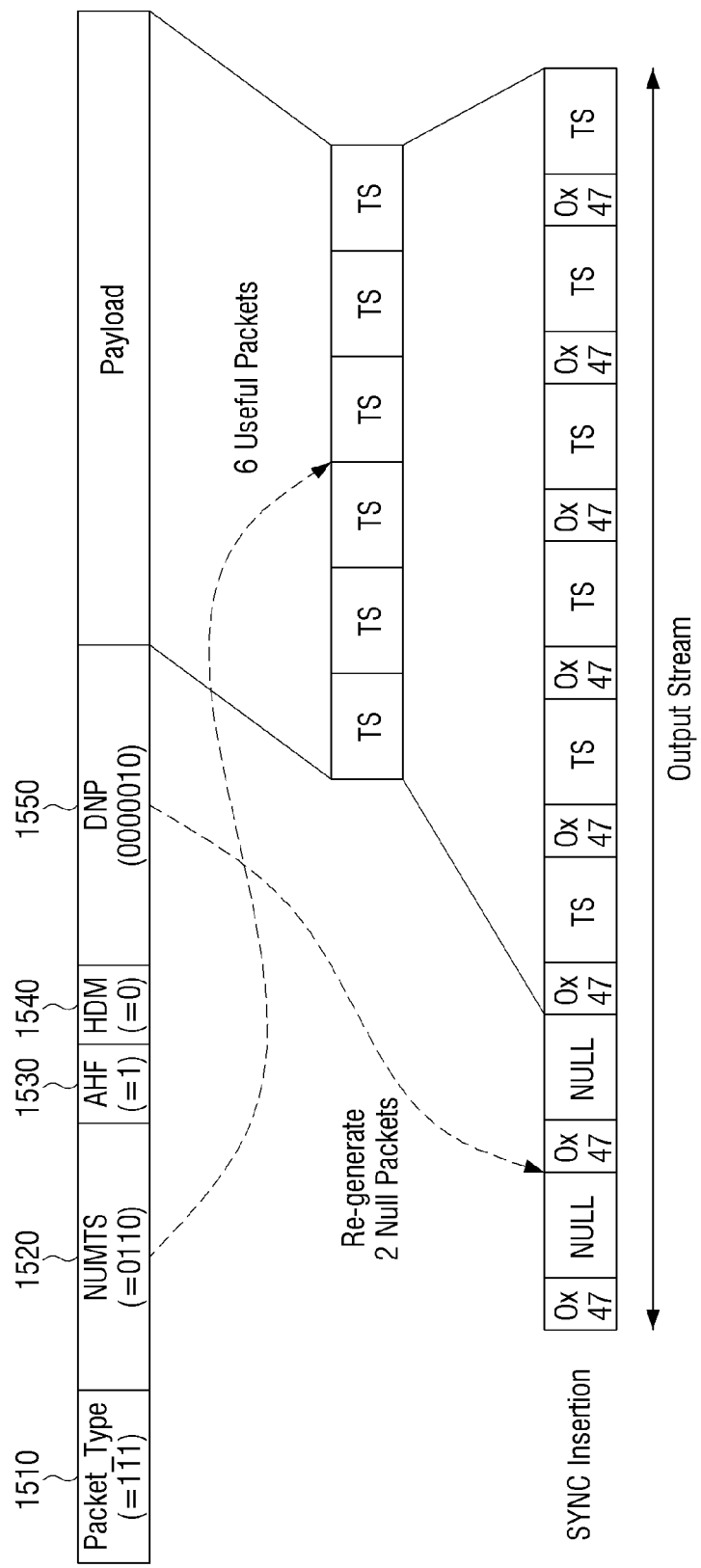
FIG. 16B illustrates a decapsulation mechanism of an ALP packet illustrated in FIG. 16A, according to an exemplary embodiment.

FIG. 16B is a diagram for describing a decapsulation mechanism of an ALP packet illustrated in FIG. 16A.

The decapsulation process at a receiver side is described below.

A DNP field 1550 is checked.

The number of TS packets is checked in the ALP packet by using the NUMTS field 1520.

The sync bytes are inserted.

The null packets which were disposed immediately before the valid TS packet group, that is the first TS packet, indicated in the DNP field 1550 are generated.

Figure 17A:
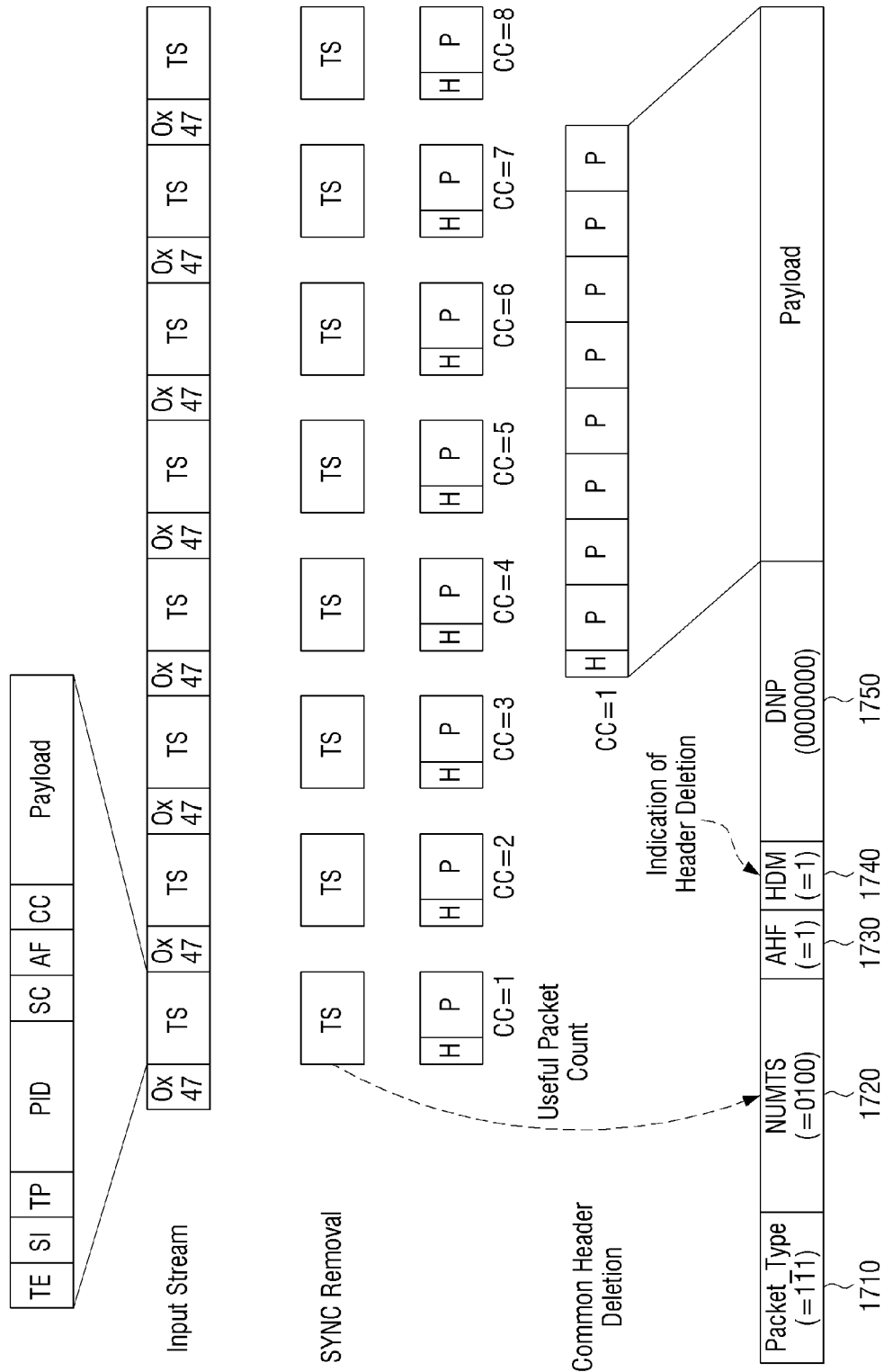
FIG. 17A illustrates TS packet encapsulation and a TS header compression mechanism according to yet another exemplary embodiment.

FIG. 17A is a diagram for describing TS packet encapsulation and a TS header compression mechanism according to yet another exemplary embodiment.

As described above, an ALP packet may be generated by compressing a header of an MPEG-2 TS packet additionally encapsulated into the ALP packet. FIG. 17A illustrates an example of an ALP packet including eight MPEG-2 TS packets having the same header except a continuity counter (CC) field. The encapsulation process is described below.

Eight TS packets having the same field except for the CC field are grouped.

The header (except for the sync bytes) is maintained only with respect to the first MPEG-2 TS packet and the header is deleted with respect to the other seven MPEG-2 TS packets. In this case, the length of the payload becomes 3+184×8=1,475 bytes. Here, the TS header may be 3 bytes.

An ALP header, i.e., a base header of an ALP packet header, having a length of 2 bytes is generated. Here, the ALP header has a value of packet_type (1710)= '111', NUMTS (1720)='0100', AHF (1730)='1', HDM (1740)='1', DNP (1750)='0000010'.

The length of the ALP packet generated as described above is 1,477 bytes and 27 bytes are saved as compared with a case in which eight MPEG-2 TS packets are directly transmitted to the PHY layer.

Figure 17B:
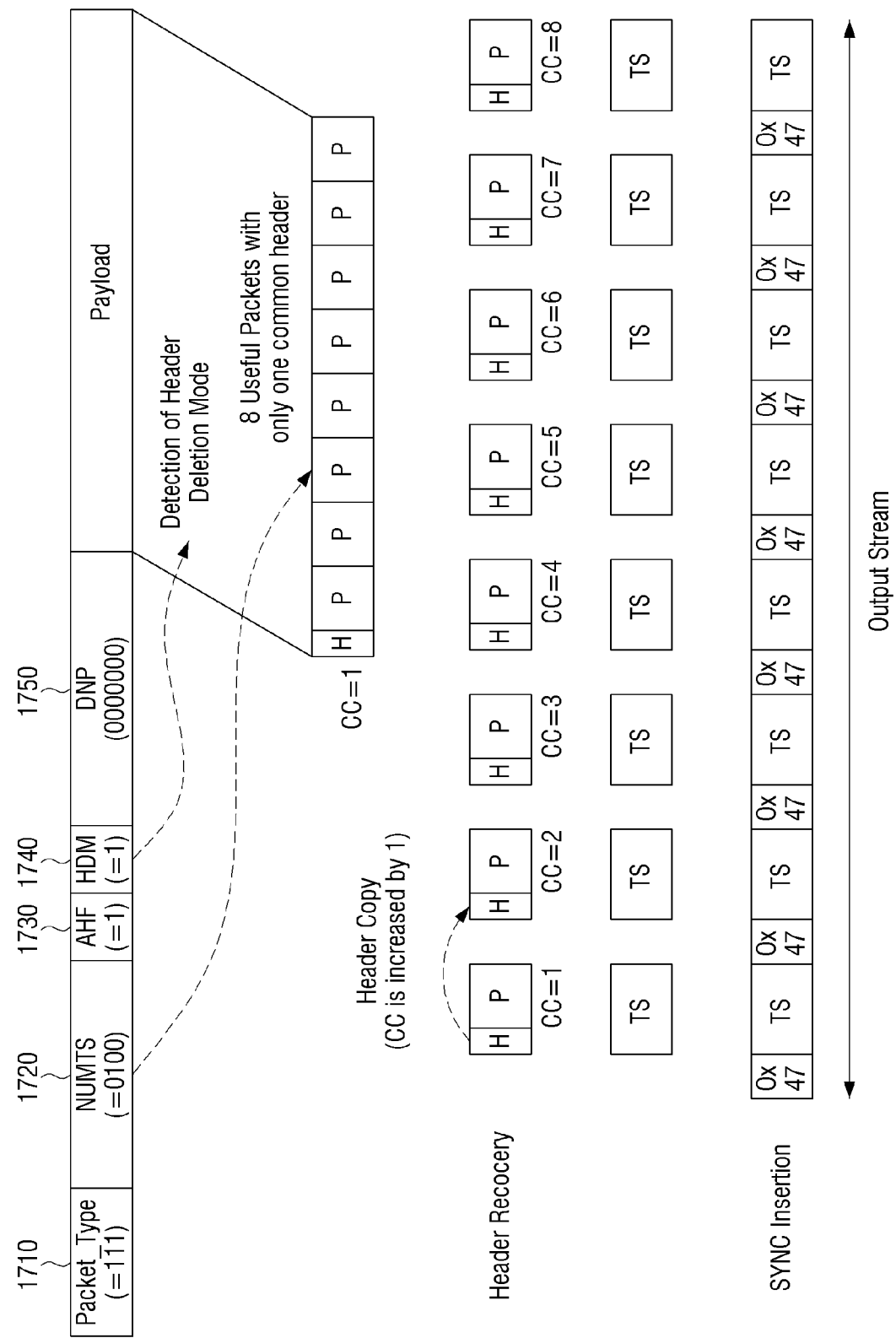
FIG. 17B illustrates decapsulation and TS header restoration mechanisms of the ALP packet illustrated in FIG. 17A, according to an exemplary embodiment.

FIG. 17B is a diagram for describing decapsulation and TS header restoration mechanisms of the ALP packet illustrated in FIG. 17A, according to an exemplary embodiment.

The decapsulation process at a receiver side is described below.

The decapsulation process at the receiver side is described below.

The TS header compression is detected by reading the HDM field 1740.

The number of TS packets is checked in the ALP packet by using the NUMTS field 1720.

The first TS packet includes a 3-byte header and a 184-byte payload and the other TS packets include only the 184-byte payload.

All TS packets are generated by using the header of the first TS packet. In this case, the consecutive CC field increases one by one.

The sync bytes are inserted.

Figure 18A:
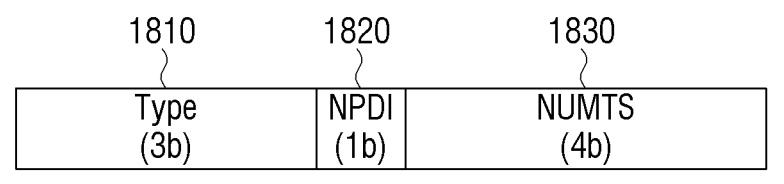
Figure 18B:
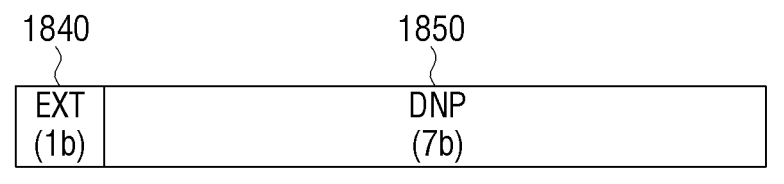
Figure 18C:
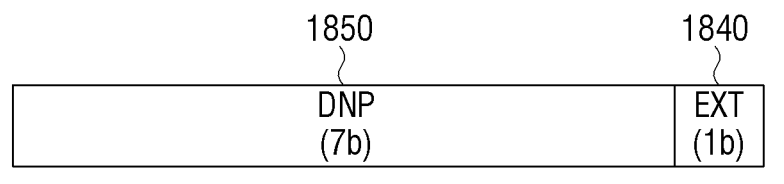

FIGS. 18A to 18C are diagrams for describing a header structure of an ALP packet according to exemplary embodiments.

FIG. 18A is a diagram illustrating a structure of a base header included in a header of an ALP packet according to another exemplary embodiment.

A Packet_Type field 1810 is the same as the Packet_Type field 7111 illustrated in FIG. 8A.

An NPDI field 1820 indicates whether at least one null TS packet is deleted. For example, the NPDI field 1820 is implemented as 1 bit, and a value "1" indicates that the null TS packet is deleted and a value "0" indicates that the null TS packet is not deleted. Here, the header does not include an additional header illustrated in FIGS. 18B and 18C.

A NUMTS field 1830 is the same as the NUMTS field 7112 illustrated in FIG. 8A.

FIGS. 18B and 18C illustrate a structure of an additional header included in a header of an ALP packet according to another exemplary embodiment. The additional header is present only when the value of the NPDI field 1820 illustrated in FIG. 18A is "1", and the additional header may be called an optional header according to a system design.

An EXT field 1840 indicates the number of deleted null TS packet groups. For example, the EXT field 1840 is implemented as a 1-bit field, and when the number of groups of deleted consecutive null TS packets is at most one, the EXT field 1840 is set to "0". On the contrary, when the EXT field 1850 is set to "1", the number of groups of consecutively deleted null TS packets is two or more and an extended header is present.

A DNP field 1850 indicates the number of null TS packets. For example, the DNP field 1850 may be implemented as a 7-bit field. According to an exemplary embodiment, when the EXT field 1840 is "0", the EXT field 1840 indicates the number of deleted null TS packets precedent to a TS packet group, and when the EXT field 1840 is "1", the EXT field 1840 indicates the number of null TS packets deleted with respect to a first group of deleted consecutive null TS packets. According to another exemplary embodiment, when the EXT field 1840 is "0", the EXT field 1840 indicates the number of deleted null TS packets after the TS packet group, and when the EXT field 1840 is "1", the EXT field 1840 indicates the number of null TS packets deleted with respect to the first group of the deleted consecutive null TS packets. The EXT field 1840 may be disposed prior to the DNP field 1850 and vice versa as illustrated in FIGS. 18B and 18C.

Figure 19:
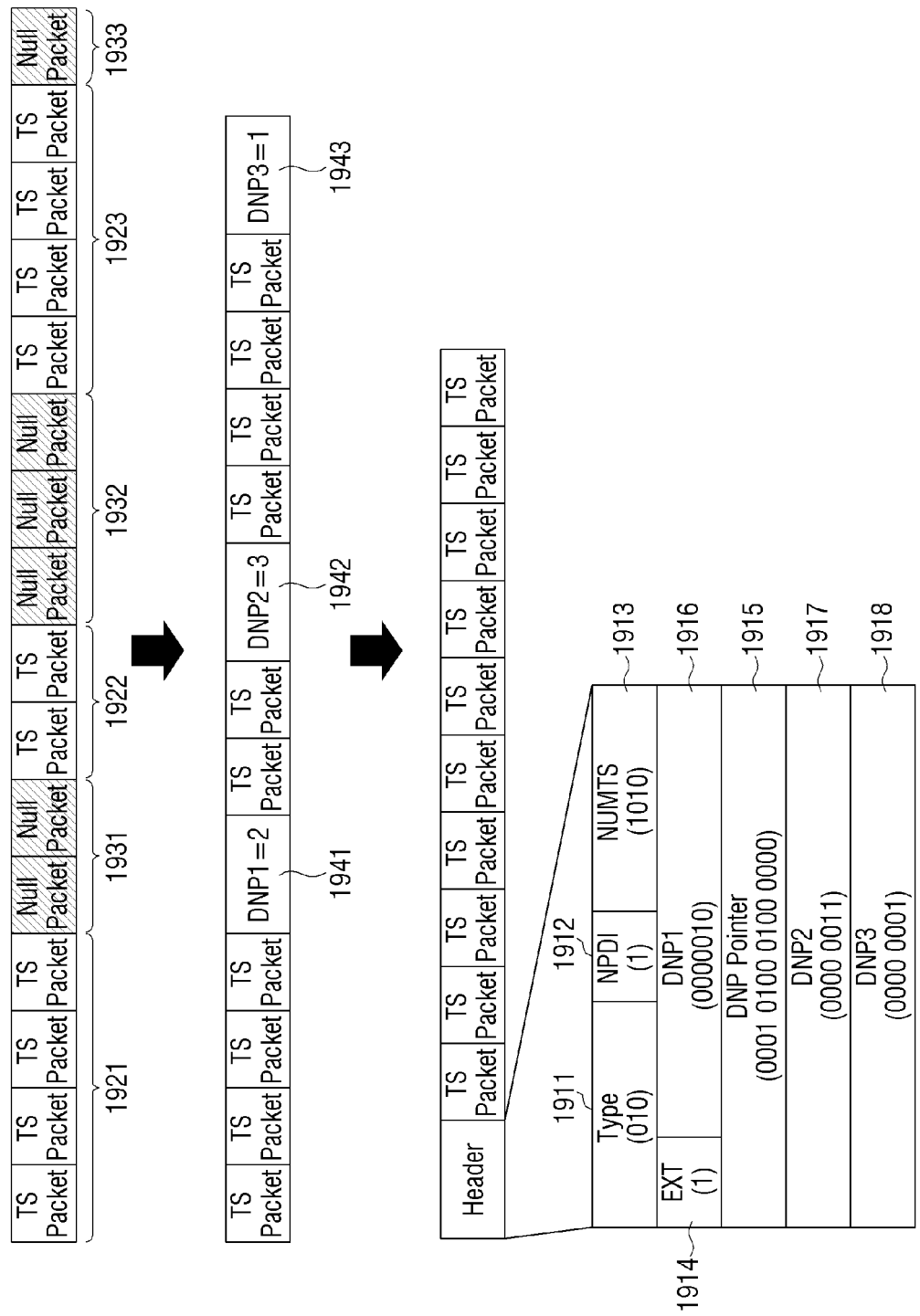
FIG. 19 illustrates a TS packet encapsulation process using the header structure illustrated in FIGS. 18A to 18C, according to an exemplary embodiment.

FIG. 19 is a diagram for describing a TS packet encapsulation process using the header structure illustrated in FIGS. 18A to 18C, according to an exemplary embodiment.

As illustrated in FIG. 19, the ALP packet may be created in an illustrated form through the TS packet encapsulation process.

In detail, a Type field 1911 is a value (for example, '010') indicating that the packet included in a payload of an ALP packet is a TS packet, an NPDI field 1912 is a value (for example, '1') indicating that at least one null packet is deleted, a NUMTS field 1913 is a value (for example, '1010') indicating that the number of TS Packets is 10, an EXT field 1914 is a value (for example, '1') indicating that the number of groups of deleted consecutive nulls TS packets is two or more, and an i-th bit of a DNP pointer field 1915 indicates whether a null TS packet deleted after an i-th TS packet is present in the payload. This DNP pointer field structure is different from that of the DNP pointer 1011 in FIG. 10B, which indicates whether a null TS packet deleted before an i-th TS packet is present in the payload. This is because a null TS packet immediately after the last TS packet in the payload is deleted prior to encapsulation, in which case the DNP pointer field structure in FIG. 10B cannot indicate the presence of the deleted null TS packet after the last TS packet in the payload. Specifically, if the DNP pointer field 1915 is set to a value '0000 1010 0000 0000' according to the DNP pointer field structure in FIG. 10B, the DNP pointer field 1915 is able to indicate only the presence of deleted null TS packets before the fifth TS packet and the seventh TS packet, but is not able to indicate the presence of the last TS packet in the payload. Respective DNP fields 1916, 1917 and 1918 may be set to values (for example, '0000010', '0000 0011', and '0000 0001') indicating that the numbers of null TS packets deleted with respect to deleted consecutive null TS packet groups are 2, 3 and 1, respectively.

Meanwhile, when the ALP packet is extracted at a receiver side, it is determined that the ALP packet includes the MPEG-2 TS packet based on '010' which is the value of the Type field 1911 of the ALP header. The null TS packet is deleted based on '1' which is the value of the NPDI field 1912, and it is determined that the additional header is present. Further, it is determined that the ALP packet includes 10 valid TS packets based on '1010' which is the value of the NUMTS field 1913.

Further, two or more null TS packet groups are deleted in the current ALP packet based on '1' which is the value of the EXT field 1914 and it is determined that an extended header is present.

It is determined that a first null TS packet group includes two null TS packets based on '0000010' which is the value of the DNP 1 field 1916 and it is determined that null TS packet groups are present after a fourth TS packet, a sixth TS packet, and a tenth TS packet, respectively based on the value of the DNP pointer field 1915. Further, it is determined that second and third null TS packet groups include three null TS packets and one null TS packet by using '0000 0011' which is the value of the DNP 2 field 1917 and '0000 0001' which is the value of the DNP 3 field 1918, respectively.

Based on the determination result, four TS packets of the payload is output, and thereafter, two null TS packets are output, two TS packets among the residual TS packets of the payload are output, and thereafter, three nulls TS packets are output, and four residual TS packets of the payload are output, and thereafter, one null TS packet is output to decapsulate the ALP packet.

Figure 20A:
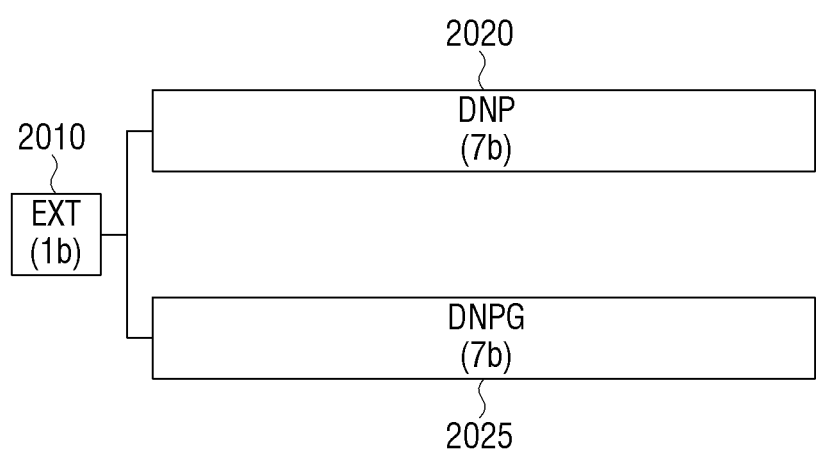
FIGS. 20A and 20B illustrate an ALP packet header structure according to another exemplary embodiment.
Figure 20B:
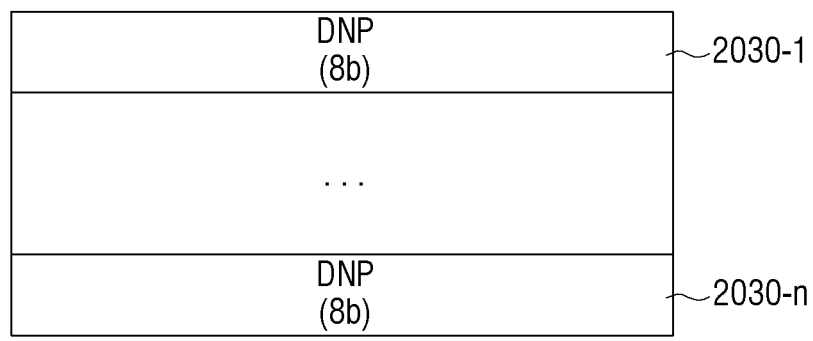

FIGS. 20A and 20B are diagrams for describing an ALP packet header structure according to another exemplary embodiment.

The configuration illustrated in FIGS. 20A and 20B illustrate an additional header structure according to another exemplary embodiment, and a configuration of a base header may be the same as that of the base header.

An EXT field 2010 indicates the number of deleted null TS packet groups. For example, the EXT field 2010 is implemented as a 1-bit field, and when the number of groups of deleted consecutive null TS packets is at most one, the corresponding field is set to "0". On the contrary, when the EXT field 2010 is set to "1", the number of groups of deleted consecutive null TS packets is two or more and an extended header is present.

A DNP field 2020 indicates the number of null TS packets deleted before a TS packet group. For example, the DNP field 2020 may be implemented as a 7-bit field. According to an exemplary embodiment, the DNP field 2020 may be present only when the EXT field 2010 is "0". According to another exemplary embodiment, the DNP field 1850 indicates the number of null TS packets deleted after the TS packet group.

A DNPG field 2025 indicates the number of deleted null TS packet groups. For example, the DNP field 2025 may be implemented as the 7-bit field. The DNPG field 2025 may be present only when the EXT field 2010 is "1".

Meanwhile, in a last TS packet of each TS packet group in which a null TS packet group is deleted after the TS packet group, a transport error indicator (TEI) field value may be set to 1.

Figure 21:
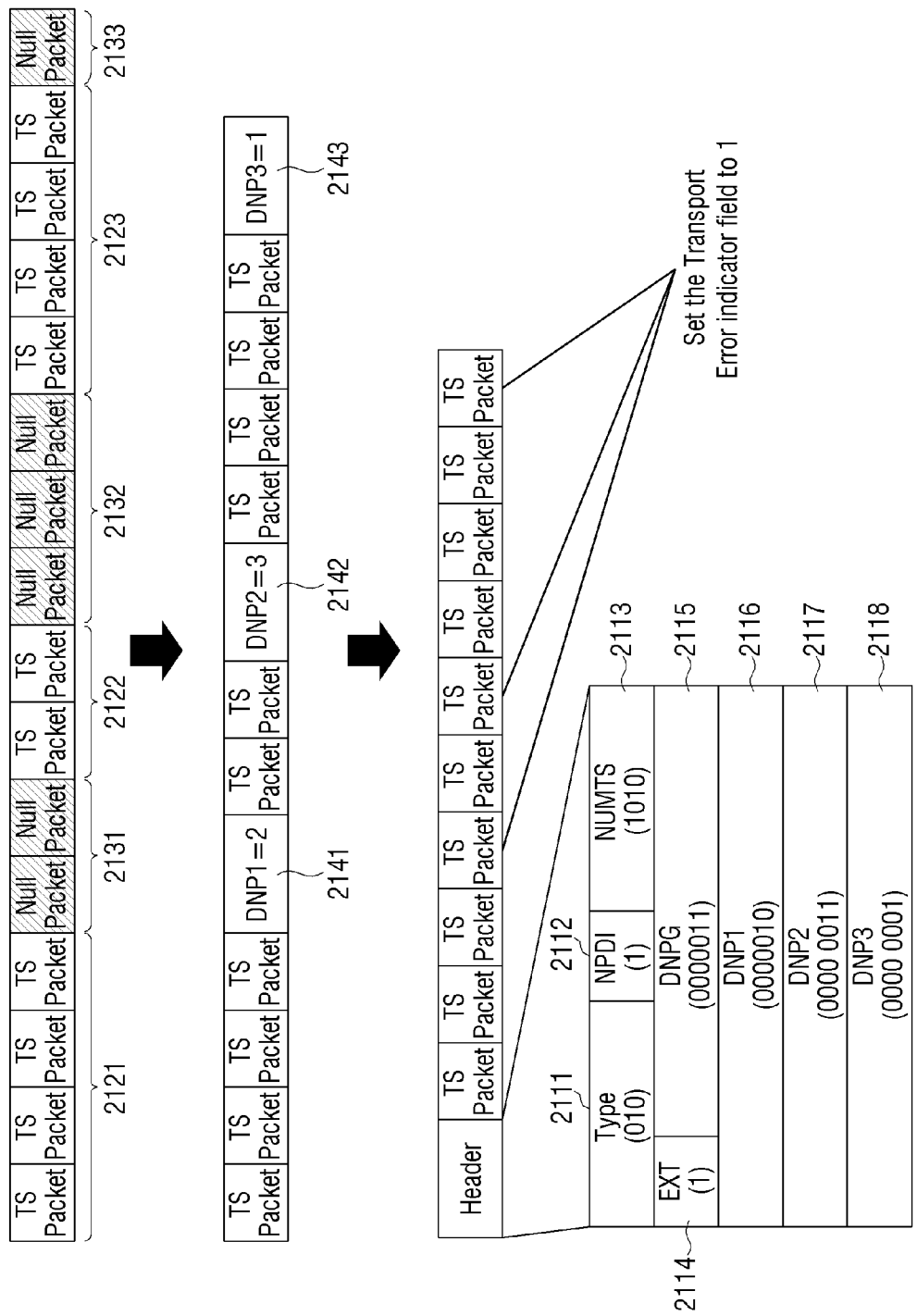
FIG. 21 illustrates a TS packet encapsulation process using the header structure illustrated in FIGS. 20A and 20B, according to an exemplary embodiment.

FIG. 21 is a diagram for describing a TS packet encapsulation process using the header structure illustrated in FIGS. 20A and 20B, according to an exemplary embodiment.

As illustrated in FIG. 21, the ALP packet may be created in an illustrated form through the TS packet encapsulation process.

In detail, a Type field 2111 is a value (for example, '010') indicating that the packet included in a payload of an ALP packet is a TS packet, an NPDI field 2112 is a value (for example, '1') indicating that at least one null packet is deleted, a NUMTS field 2113 is a value (for example, '1010') indicating that the number of TS Packets is 10, an EXT field 2114 is a value (for example, '1') indicating that the number of groups of deleted consecutive nulls TS packets is two or more, and an i-th bit of a DNPG field 2115 is a value (for example, '000011') indicating that three null TS packet groups are deleted in the ALP packet, and respective DNP fields 2116, 2117 and 2118 may be set to values (for example, '0000010', '0000 0011', and '0000 0001') indicating that the numbers of null TS packets deleted with respect to respective deleted consecutive null TS packet groups are 2, 3 and 1, respectively.

Meanwhile, when the ALP packet is extracted at a receiver side, it is determined that the current ALP packet includes the MPEG-2 TS packet based on '010' which is the value of the Type field 2111 of the ALP header. The null TS packet is deleted based on '1' which is the value of the NPDI field 2112, and it is determined that an additional header is present. Further, it is determined that the current ALP packet includes 10 valid TS packets based on '1010' which is the value of the NUMTS field 2113.

Further, two or more null TS packet groups are deleted in the current ALP packet based on '1' which is the value of the EXT field 2114 and it is determined that an extended header is present and subsequent 7 bits are the DNPG field.

It is determined that three groups of deleted null TS packets are present based on '0000011' which is the value of the DNPG field 2115.

It is determined that a first null TS packet group includes two null TS packets based on '0000010' which is the value of the DNP 1 field 2116, and it is determined that second and third null TS packet groups include three and one null TS packets, respectively by using '0000 0011' which is the value of the DNP 2 field 1917 and '0000 0001' which is the value of the DNP 3 field 1918.

Further, by examining a TEI field while outputting each TS packet, two null TS packets are output after a first packet in which the TEI field value of the TS packet is 1, three null TS packets are output after a second packet in which the TEI field value of the TS packet is 1, and one null TS packet is output after the first packet in which the TEI field value of the TS packet is 1 to decapsulate the ALP packet.

Figure 22:
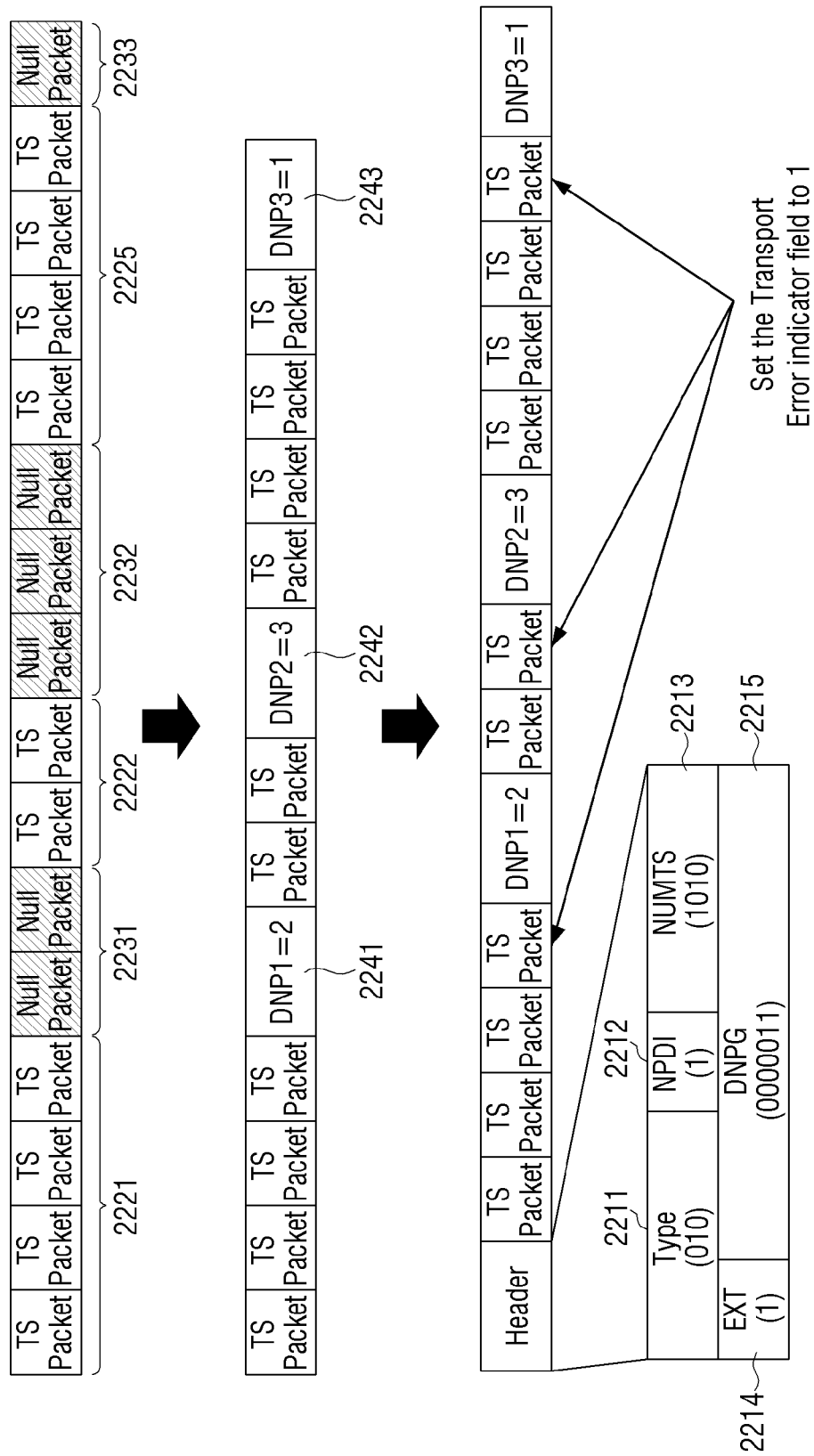
FIG. 22 illustrates a TS packet encapsulation mechanism according to yet another exemplary embodiment.

FIG. 22 is a diagram for describing a TS packet encapsulation mechanism according to yet another exemplary embodiment.

As illustrated in FIG. 22, a separate DNP field is not used in a header, and DNP values 2241, 2242 and 2243 may be recorded in locations where respective null TS packet groups 2231, 2232 and 2233 are deleted in a payload. In this case, a base header may similarly include a TYPE field 2211, an NPDI field 2212 and an NUMTS field 2213, and an additional header may include only an EXT field 2114 and a DNPG field 2115. However, in some cases, the DNPG field 2115 may be omitted.

Meanwhile, when the exemplary embodiments are used in one system, the EXT field is extended to an appropriate bit number (for example, 2 bits) to indicate what method is used.

Figure 23:
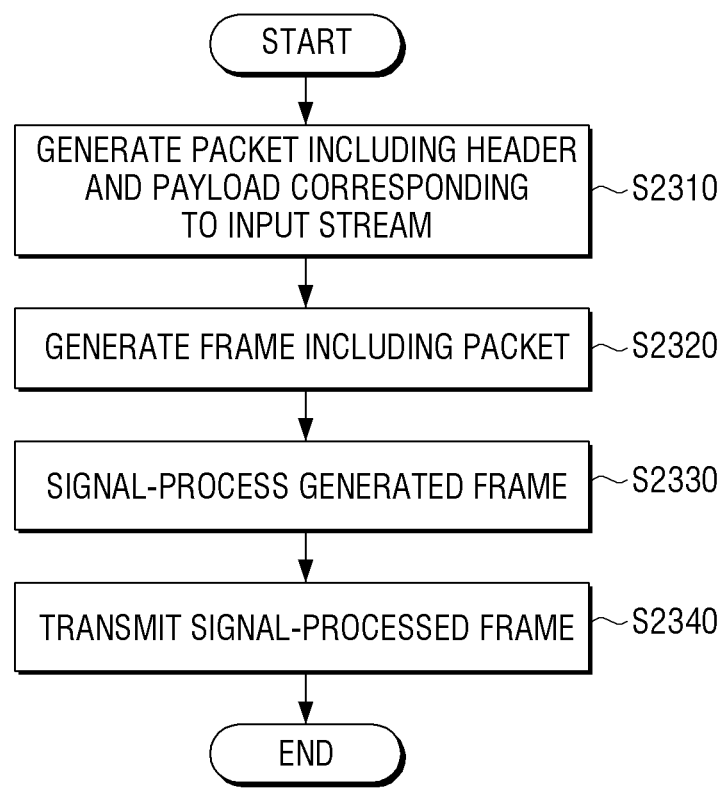
FIG. 23 is a flowchart for describing a signal processing method of a transmitting apparatus, according to an exemplary embodiment.

FIG. 23 is a flowchart for describing a signal processing method of a transmitting apparatus, according to an exemplary embodiment.

According to the signal processing method of the transmitting apparatus illustrated in FIG. 23, first, a packet including a header and a payload corresponding to an input stream, that is, an ALP packet is generated (S2310). A base header constituting the header may include a first field representing a packet type of an input stream and when the first field is set to a value indicating that the packet type of the input stream is a TS packet, the base header may include a second field indicating the number of TS packets included in the payload and a third field set to a first value indicating that there is no additional header or a second value indicating that there is the additional header, and when the third field is set to the second value, the additional header includes a fourth field indicating the number of deleted null packets with respect to each of at least one TS packet group constituted by consecutive TS packets. The null packet deleted with respect to each TS packet group becomes null TS packet subsequently preceding the first TS packet included in each TS packet group among the plurality of packets included in the input stream.

Subsequently, a frame including the generated packet, that is, a baseband packet is generated (S2320).

The generated baseband packet is signal-processed (S2330).

Thereafter, the signal-processed frame is transmitted (S2340). Herein, the signal-processed frame may become a transmission frame.

Figure 24A:
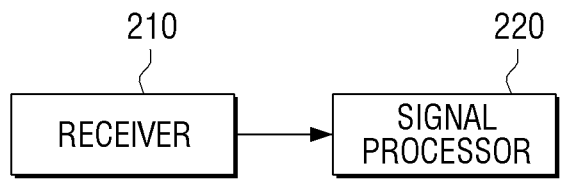
FIG. 24A illustrates a configuration of a receiving apparatus according to an exemplary embodiment.

FIG. 24A is a block diagram illustrating a configuration of a receiving apparatus according to an exemplary embodiment.

Referring to FIG. 24A, the receiving apparatus 200 includes a receiver 210 and a signal processor 220.

The receiving apparatus 200 may be implemented to receive data from a transmitting apparatus that maps data included in the input stream to at least one signal processing path and transmits the mapped data.

The receiver 210 receives a frame including the data mapped to at least one signal processing path. In detail, the receiver 210 may receive a stream including signaling information and the data mapped to at least one signal processing path. Herein, the signaling information may include information on an input type of the input stream input into the transmitting apparatus and information on a data type mapped to at least one signal processing path. Herein, the information on the input type of the input stream may indicate whether all signal processing paths in the frame are the same input type. Besides, since detailed information included in the signaling information has been described above, detailed description will be omitted.

The signal processor 220 extracts the signaling information from the received frame. In particular, the signal processor 220 may acquire various information on the corresponding PLP included in an L1 pre signaling area and an L1 post signaling area by extracting and decoding L1 signaling. Further, the signal processor 230 may signal-process the frame based on the extracted signaling information. For example, in the signal processing, demodulation, frame de-builder, BICM decoding, and input de-processing processes may be performed.

In detail, the signal processor 220 signal-processes the transmission frame received by the receiver 210 to generate the baseband packet and extracts the header information from the ALP packet included in the generated baseband packet.

In addition, the signal processor 220 signal-processes payload data included in the ALP packet based on the extracted header information to restore the stream, that is, the input stream first input into the transmitting apparatus 100. Herein, the extracted header information includes a field indicating a payload data type and a field indicating whether the ALP packet transmits a complete input packet.

Figure 24B:
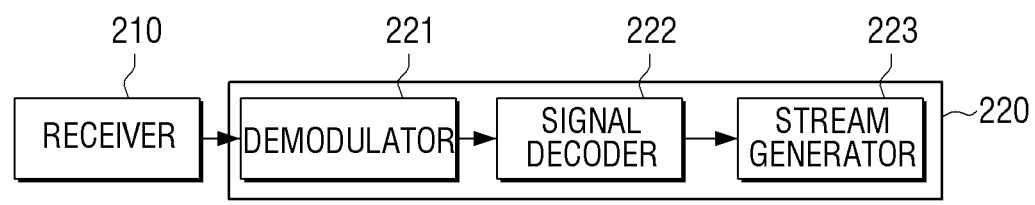
FIG. 24B is a block diagram illustrating a signal processor according to an exemplary embodiment in detail.

FIG. 24B is a block diagram illustrating a signal processor according to an exemplary embodiment in detail.

Referring to FIG. 24B, the signal processor includes a demodulator 221, a decoder 222, and a stream generator 223.

The demodulator 221 performs demodulation according to an OFDM parameter from a received RF signal to perform sync detection, and, when the sync is detected, recognizes whether a frame currently received is a frame including required service data from signaling information stored in a sync area. For example, whether a mobile frame is received or whether a fixed frame is received may be recognized.

In this case, when OFDM parameters for a signaling area and a data area are not predetermined, the OFDM parameters for the signaling area and the data area stored in the sync area are acquired to demodulate OFDM parameter information for a signaling area and a data area immediately subsequent to the sync area.

The decoder 222 decodes the required data. In this case, the decoder 222 may acquire and decode parameters including an FEC scheme, a modulation scheme, and the like for data stored in each data area by using the signaling information. Further, the decoder 223 may calculate the location of the required data based on the data information included in the header. That is, at which location of the frame a required PLP is transmitted may be calculated.

The stream generator 223 processes the baseband packet received from the decoder 222 to generate data to be serviced.

As one example, the stream generator 223 may generate an ALP packet from an error-corrected baseband packet based on various information. In detail, the stream generator 223 may include de-jitter buffers and the de-jitter buffers may regenerate an accurate timing for restoring an output stream based on various information. As a result, a delay for sync among a plurality of PLPs may be compensated.

Figure 25:
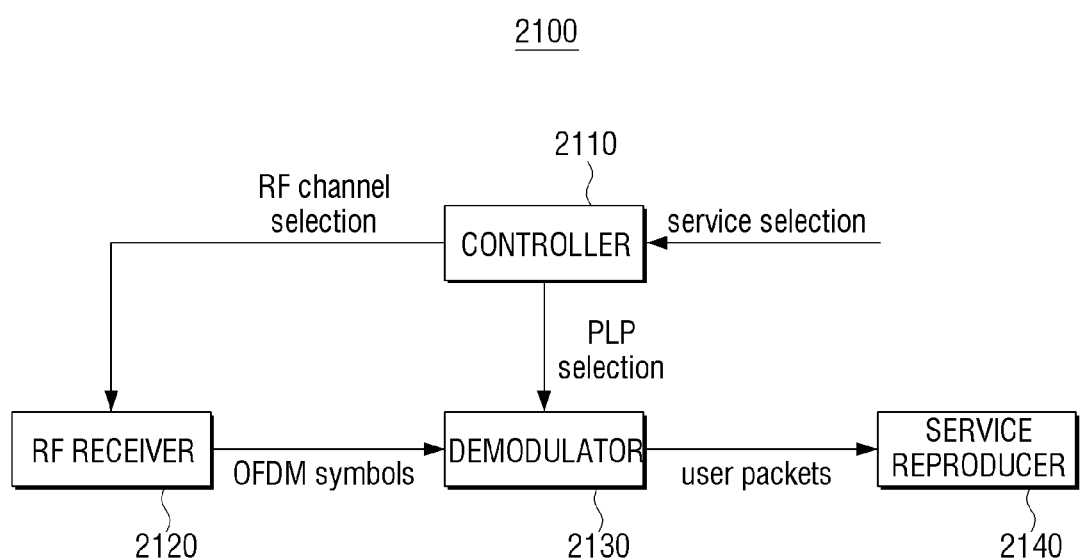
FIG. 25 is illustrates a configuration of a receiver according to an exemplary embodiment.

FIG. 25 is a block diagram illustrating a configuration of a receiver according to an exemplary embodiment.

Referring to FIG. 25, the receiver 2100 may include a controller 2110, an RF receiver 2120, a demodulator 2130, and a service reproducer 2140.

The controller 2110 determines an RF channel and a PLP in which a selected service is transmitted. In this case, the RF channel may be specified as a center frequency and a bandwidth, and the PLP may be specified as a PLP identifier (ID). A specific service may be transmitted through one or more PLPs that belong to one or more RF channels for each of components constituting the service, but hereinafter, it is assumed that all data required to reproduce one service are transmitted to one PLP transmitted to one RF channel for easy description. That is, the service has a unique data acquisition path for reproducing the service, and the data acquisition path is specified as the RF channel and the PLP.

The RF receiver 2120 detects an RF signal in the RF channel selected by the controller 2110, and transfers to the demodulator 2130 OFDM symbols extracted by signal-processing the RF signal. Here, the signal processing may include synchronization, channel estimation, and equalization, and information for the signal processing is a value predetermined by the transmitter and the receiver or is included in a specific OFDM symbol predetermined among OFDM symbols to be transferred in the receiver according to a system design.

The demodulator 2130 signal-processes the OFDM symbols to extract a user packet and transfers the extracted user packet to the service reproducer 2140, and the service reproducer 2140 reproduces and outputs a service selected by the user by using the user packet. In this case, a format of the user packet may vary depending on an implementation scheme of the service and as one example, a TS packet or an IPv4 packet is provided.

Figure 26:
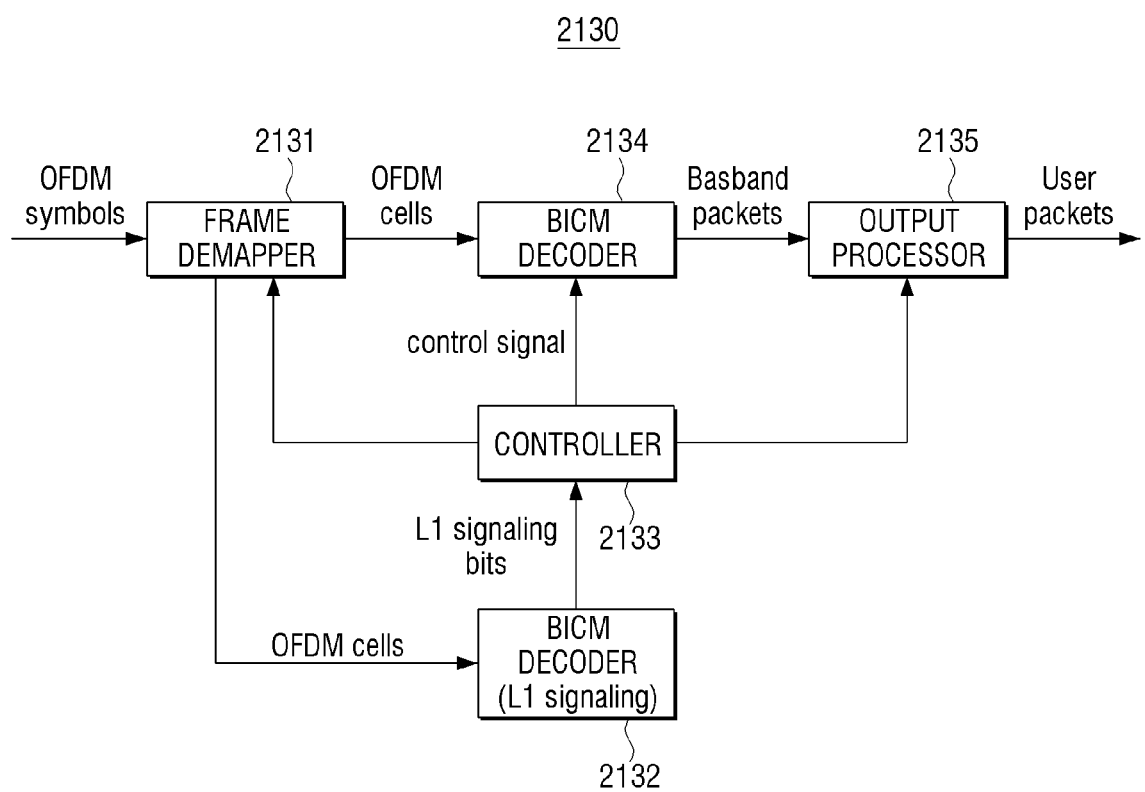
FIG. 26 illustrates the demodulator illustrated in FIG. 25 according to an exemplary embodiment in more detail.

FIG. 26 is a block diagram illustrating the demodulator illustrated in FIG. 25 according to an exemplary embodiment in more detail.

Referring to FIG. 26, the demodulator 2130 may be configured to include a frame demapper 2131, a BICM decoder 2132 for the L1 signaling, a controller 2133, a BICM decoder 2134, and an output processor 2135.

The frame demapper 2131 selects OFDM cells constituting FEC blocks that belong to a PLP selected in a frame constituted by the OFDM symbols based on control information transferred in the controller 2133, and transfers the selected OFDM cells to the BICM decoder 2134 and further, selects the OFDM cells corresponding to one or more FEC blocks included in the L1 signaling, and transfers the selected OFDM cells to the BICM decoder 2132 for the L1 signaling.

The BICM decoder 2132 for the L1 signaling signal-processes the OFDM cell corresponding to the FEC block included in the L1 signaling to extract L1 signaling bits, and transfers the extracted L1 signaling bits to the controller 2133. In this case, the signal processing may include a process of extracting a log-likelihood ratio (LLR) value for decoding an Low Density Parity Check (LDPC) code in the OFDM cell and a process of decoding the LDPC code by using the extracted LLR value.

The controller 2133 extracts an L1 signaling table from the L1 signaling bits and controls operations of the frame demapper 2131, the BICM decoder 2134, and the output processor 2135 by using a value of the L1 signaling table. In FIG. 22, it is illustrated that the BICM decoder 2132 for the L1 signaling does not use the control information of the controller 2133 for easy description. However, when the L2 signaling has a hierarchical structure similar to structures of the L1-pre and the L1-post, the BICM decoder 2132 for the L1 signaling may be constituted by one or more BICM decoding blocks and it is apparent that operations of the BICM decoding blocks and the frame demapper 2131 may be controlled by higher-layer L1 signaling information.

The BICM decoder 2134 signal-processes the OFDM cells constituting the FEC blocks that belong to the selected PLP to extract a baseband packet, and transfer the baseband packet to the output processor 2135. The signal processing may include a process of extracting an LLR value for encoding and decoding the LDPC code in the OFDM cell and a process of decoding the LDPC code by using the extracted LLR value, and be performed based on the control information transferred in the controller 2133.

The output processor 2135 signal-processes the baseband packet to extract a user packet and transfers the extracted user packet to the service reproducer 2140. In this case, the signal processing may be performed based on the control information transferred in the controller 2133.

FIG. 27 is a flowchart schematically illustrating an operation of a receiver from the time when a user selects a service up to the time when the selected service is actually reproduced, according to an exemplary embodiment.

It is assumed that before service selection of a user (S2710), service information of all services which are selectable is acquired in initial scan (S2700). Here, the service information may include information on an RF channel and a PLP in which data required to reproduce a specific service is transmitted in a current broadcasting system. One example of the service information includes Program-Specific Information/Service Information (PSI/SI) of MPEG2-TS and may be generally acquired through L2 signaling and higher-layer signaling.

When the user selects a service (S2710), the receiver changes a current frequency to a frequency to transmit the selected service (S2720) and performs RF signal detection (S2730). During the process of changing the current frequency to the frequency to transmit the selected service (S2720), the service information may be used.

When the RF signal is detected, the receiver performs an L1 signaling extraction operation (S2740) from the detected RF signal. Thereafter, the receiver selects the PLP that transmits the service selected by using the L1 signaling extracted in the previous process (S2750) and extracts a baseband packet from the selected PLP (S2760). During the process of selecting the PLP that transmits the selected service (S2750), the service information may be used.

Further, a process of extracting the baseband packet (S2760) may include a process of selecting OFDM cells that belong to the PLP by demapping a transmission frame, extracting an LLR value for encoding/decoding an LDPC code in an OFDM cell, and a process of decoding the LDPC code by using the extracted LLR value.

The receiver performs ALP packet extraction (S2770) from the baseband packet extracted by using header information of the extracted baseband packet, and performs user packet extraction (S2780) from the ALP packet extracted by using header information of the ALP packet extracted afterwards. The extracted user packets are used for selected service reproduction (S2790). In the ALP packet extraction (S2770) process and the user packet extraction (S2780) process, L1 signaling information acquired in the L1 signaling extraction (S2740) step may be used. In this case, the process of extracting the user packet from the ALP packet (restoring the Null TS packets and inserting the TS sync bytes) is similar to the aforementioned process.

According to the various exemplary embodiments as described above, various types of data may be mapped to the transmittable physical layer at a transmitter side and data processing efficiency may be improved. Further, a packet is filtered in a link layer at a receiver side to increase data processing efficiency.

At least one of the components, elements, modules or units represented by a block in the drawings may be embodied as various numbers of hardware, software and/or firmware structures that execute respective functions described above, according to an exemplary embodiment. For example, at least one of these components, elements, modules or units may use a direct circuit structure, such as a memory, processing, logic, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The above-described methods and operations or steps for the methods may also be implemented as a computer readable code in a computer readable recording medium. The computer readable recording medium is any data storage device capable of storing data which is readable by a computer system. Examples of the computer readable recording medium may include a read-only memory (ROM), a random-access memory (RAM), CD-ROMs, magnetic tapes, floppy disks, optical data storage devices, and carrier waves (such as data transmission through the Internet). The computer readable recording medium may also be distributed through computer systems connected through a network, and as a result, the computer readable code is stored and executed in a distribution method. Further, functional programs, codes, and code segments for achieving the exemplary embodiments can be easily analyzed by programmers skilled in the art to which the present disclosure is applied.

Further, it can be seen that the apparatus and the method according to the exemplary embodiments can be implemented by hardware, software, or a combination of the hardware and the software. Predetermined software may be stored in a volatile or nonvolatile storage device, such as ROM, a memory, such as RAM, a memory chip, a device, or an integrated circuit, or a storage medium, such as a CD, a DVD, a magnetic disk, or a magnetic tape, which may optically or magnetically records data and is simultaneously readable by a machine (e.g. a computer), regardless of whether the predetermined software is deletable or rewritable. The methods or operations of the methods described above can be implemented by a computer or a portable terminal including a controller and the memory and it can be seen that the memory is one example of a program including instructions implementing the exemplary embodiments or the machine readable storage medium which is suitable for storing programs.

Accordingly, the exemplary embodiments includes a program including a code for implementing an apparatus and a method described in any claims of the specification and a machine (computer) readable storage medium storing the program. Further, the program may be electronically carried through any medium such as a communication signal transferred through wired or wireless connection and the present disclosure appropriately includes equivalents thereto.

Further, the apparatuses according to the exemplary embodiment can receive and store a program from a program providing device connected in a wired or wireless method. A program providing device may include a program including instructions that allow a program processing device to perform a predetermined content protecting method, a memory for storing information necessary for the content protecting method, a communicator for performing wired or wireless communication with a graphic processing device, and a controller for transmitting a corresponding program to a transmission/reception device automatically or according to a request of the graphic processing device.

Meanwhile, the detailed exemplary embodiments have been described in the Detailed Description, but various modifications can be made without departing from the scope. Therefore, the scope should not be limited to the exemplary embodiment and should be defined by the appended claims and equivalents to the appended claims.

What is claimed is:

1. A transmitting apparatus comprising at least one processor configured to implement:
   a packet generator receiving a plurality of transport stream (TS) packets and generating a packet comprising a header and a payload; and
   a transmitter transmitting the generated packet,
   wherein the header comprises a first field, a second field, and a third field,
   wherein the plurality of TS packets comprise at least one of a null TS packet group and a non-null TS packet group,
   wherein the first field comprises a value indicating that a packet type of the plurality of TS packets,
   wherein the second field comprises a value indicating a number of deleted null TS packet groups,
   wherein the third field comprises a value indicating a number of deleted null TS packets included in a deleted null TS packet group,
   wherein the number of the deleted null TS packets is a number of null TS packets included in a null TS packet group which precedes a non-null TS packet group, and
   wherein if the second field comprises a first value, the third field is a value indicating a number of deleted null TS packets included in a first null TS packet group among the deleted null TS packet groups.

2. The transmitting apparatus of claim 1, wherein each of the TS packets comprises sync information which is removed when the TS packets are encapsulated in the payload of the packet to generate the packet.

3. The transmitting apparatus of claim 1, wherein the header comprises a field indicating a location of the deleted null packets with respect to a TS packet closest to the deleted null packets.

4. The transmitting apparatus of claim 1, wherein the packet is a link-layer protocol packet which is to be mapped to a physical layer before being transmitted out from the transmitting apparatus.

5. A signal processing method of a transmitting apparatus, comprising:
   receiving a plurality of transport stream (TS) packets, and generating a packet comprising a header and a payload from an input stream comprising a plurality of transport stream (TS) packets; and
   transmitting the packet,
   wherein the header comprises a first field, a second field, and a third field,
   wherein the plurality of TS packets comprise at least one of a null TS packet group and a non-null TS packet group,
   wherein the first field comprises a value indicating that a packet type of the plurality of TS packets,
   wherein the second field comprises a value indicating a number of deleted null TS packet groups,
   wherein the third field comprises a value indicating a number of deleted null TS packets included in a deleted null TS packet group,
   wherein the number of the deleted null TS packets is a number of null TS packets included in a null TS packet group which precedes a non-null TS packet group, and
   wherein if the second field comprises a first value, the third field is a value indicating a number of deleted null TS packets included in a first null TS packet group among the deleted null TS packet groups.

6. The signal processing method of claim 5, wherein each of the TS packets comprises sync information which is removed when the TS packets are encapsulated in the payload of the packet to generate the packet.

7. The signal processing method of claim 5, wherein the header comprises a field indicating a location of the deleted null packets with respect to a TS packet closest to the deleted null packets.

8. The signal processing method of claim 5, wherein the packet is a link-layer protocol packet which is to be mapped to a physical layer before being transmitted out from the transmitting apparatus.

9. A non-transitory computer readable recording medium having recorded thereon a program for executing the signal processing method of claim 5.

* * * * *